(12) United States Patent
Filippov et al.

(10) Patent No.: US 11,647,185 B2
(45) Date of Patent: May 9, 2023

(54) METHOD AND APPARATUS FOR FILTERING WITH DIRECTIONAL PREDICTION

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/201,228

(22) Filed: Mar. 15, 2021

(65) Prior Publication Data

US 2021/0203928 A1 Jul. 1, 2021

Related U.S. Application Data

(63) Continuation of application No. PCT/RU2019/050153, filed on Sep. 13, 2019.
(Continued)

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/159* (2014.11);
(Continued)

(58) Field of Classification Search
CPC .. H04N 19/117; H04N 19/132; H04N 19/159; H04N 19/176; H04N 19/182;
(Continued)

(56) References Cited

U.S. PATENT DOCUMENTS

2012/0093426 A1* 4/2012 Sato ............... H04N 19/11
382/233
2013/0182779 A1* 7/2013 Lim ............... H04N 19/463
375/240.29
(Continued)

FOREIGN PATENT DOCUMENTS

CN 101895751 A 11/2010
CN 102984523 A 3/2013
(Continued)

OTHER PUBLICATIONS

ITU-T H.261 (Mar. 1993), Line Transmission of Non-Telephone Signals, Video Codec for Audiovisual Services at p x 64 kbits, total 29 pages.
(Continued)

*Primary Examiner* — Richard T Torrente
(74) *Attorney, Agent, or Firm* — Womble Bond Dickinson (US) LLP

(57) ABSTRACT

Methods and devices for intra-prediction of a current block in video encoding or decoding are provided. A method includes: performing intra-prediction processing of the current block according to a directional intra-prediction mode, including applying reference sample filtering or subpixel interpolation filtering to reference samples in one or more reference blocks, wherein the directional intra-prediction mode is classified into one of the following groups: (A) vertical or horizontal modes, (B) directional modes including diagonal modes that represent angles which are multiples of 45 degrees, (C) remaining directional modes; if the directional intra-prediction mode is classified as belonging to group B, a reference sample filter is applied to the reference samples; if the directional intra-prediction mode is classified as belonging to group C, an intra reference sample interpolation filter is applied to the reference samples.

10 Claims, 11 Drawing Sheets

Related U.S. Application Data

(60) Provisional application No. 62/822,868, filed on Mar. 23, 2019, provisional application No. 62/822,775, filed on Mar. 22, 2019, provisional application No. 62/731,970, filed on Sep. 16, 2018.

(51) Int. Cl.
| | |
|---|---|
| *H04N 19/159* | (2014.01) |
| *H04N 19/176* | (2014.01) |
| *H04N 19/182* | (2014.01) |
| *H04N 19/184* | (2014.01) |
| *H04N 19/503* | (2014.01) |
| *H04N 19/593* | (2014.01) |

(52) U.S. Cl.
CPC ......... *H04N 19/176* (2014.11); *H04N 19/182* (2014.11); *H04N 19/184* (2014.11); *H04N 19/503* (2014.11); *H04N 19/593* (2014.11)

(58) Field of Classification Search
CPC .. H04N 19/184; H04N 19/503; H04N 19/593; H04N 19/157; H04N 19/80; H04N 19/11
See application file for complete search history.

(56) References Cited

U.S. PATENT DOCUMENTS

| | | | |
|---|---|---|---|
| 2017/0034536 A1 | 2/2017 | Filippov et al. | |
| 2017/0150180 A1 | 5/2017 | Lin et al. | |
| 2018/0035112 A1 | 2/2018 | Kim et al. | |
| 2018/0091825 A1* | 3/2018 | Zhao | H04N 19/117 |
| 2018/0262756 A1 | 9/2018 | Filippov et al. | |
| 2019/0268594 A1* | 8/2019 | Lim | H04N 19/117 |
| 2020/0021817 A1* | 1/2020 | Van der Auwera | H04N 19/52 |
| 2020/0137401 A1* | 4/2020 | Kim | H04N 19/117 |

FOREIGN PATENT DOCUMENTS

| | | |
|---|---|---|
| CN | 103248892 A | 8/2013 |
| CN | 106134201 A | 11/2016 |
| CN | 107071434 A | 8/2017 |
| CN | 108293130 A | 7/2018 |
| CN | 108353171 A | 7/2018 |
| WO | 2017043786 A1 | 3/2017 |
| WO | 2020216255 A1 | 10/2020 |

OTHER PUBLICATIONS

ITU-T H.264(Feb. 2014), Series H: Audiovisual and Multimedia Systems Infrastructure of audiovisual services—Coding of moving video, Advanced video coding for generic audiovisual services, total 790 pages.

ITU-T H.265(Feb. 2018), Series H: Audiovisual and Multimedia Systems Infrastructure of audiovisual services—Coding of moving video, High efficiency video coding, total 692 pages.

JVET-K0064-v2, Geert Van der Auwera et al, CE3-related: On MDIS and intra interpolation filter switching, Joint Video Experts Team (JVET) of ITU-T SG 16 WP 3 and ISO/IEC JTC 1/SC 29/WG 11, 11th Meeting: Ljubljana, SI, Jul. 10-18, 2018, total 7 pages.

JVET-K0211-v1, Virginie Drugeon et al, CE3: DC mode without divisions and modifications to intra filtering (Tests 1.2.1, 2.2.2 and 2.5.1), Joint Video Experts Team (JVET) of ITU-T SG 16 WP 3 and ISO/IEC JTC 1/SC 29/WG 11, 11th Meeting: Ljubljana, SI, Jul. 10-18, 2018, total 9 pages.

JVET-K1023-v2, Geert Van der Auwera et al, Description of Core Experiment 3: Intra Prediction and Mode Coding, Joint Video Experts Team (JVET) of ITU-T SG 16 WP 3 and ISO/IEC JTC 1/SC 29/WG 11, 11th Meeting: Ljubljana, SI, Jul. 10-18, 2018, total 34 pages.

Xiaozhong Xu et al, Intra Block Copy in HEVC Screen Content Coding Extensions, IEEE Journal on Emerging and Selected Topics in Circuits and Systems, vol. 6, No. 4, Dec. 2016, total 11 pages.

Series H: Audiovisual and Multimedia Systems Infrastructure of audiovisual services—Coding of moving video, Recommendation ITU-T H.264 (Apr. 2017) Advanced video coding for generic audiovisual services, ITU-T, 2017, pp. 131-136.

Koo, Moonmo et al., Description of SDR video coding technology proposal by LG Electronics, Joint Video Experts Team (JVET) of ITU-T SG 16 WP 3 and ISO/IEC JTC 1/SC 29/WG 11 10th Meeting: San Diego, CA, Apr. 10-20, 2018, [JVET-J0017-V1], JVET-J0017 (version 2), ITU-T, Apr. 12, 2018, URL: http://phenix.it-sudparis.eu/jvet/doc_end_user/documents/10_San%20Diego/wg11/JVET-J0017-v2.zip>: JVET-J0017_r1.docx: p. 19.

Recommendation ITU-T H.265,"High efficiency video coding", Series H: Audiovisual and Multimedia Systems Infrastructure of audiovisual services Coding of moving video, H.265 (Apr. 1, 2013),total:14 pages.

Xia Peng et al, Rapid Intra-predication Algorithm Based on AVS1-P2, Dec. 2010, 3 pages.

* cited by examiner

METHOD AND APPARATUS FOR FILTERING WITH DIRECTIONAL PREDICTION

CROSS-REFERENCE TO RELATED APPLICATIONS

This application is a continuation of International Application No. PCT/RU2019/050153, filed on Sep. 13, 2019, which claims priority to U.S. provisional Application No. 62/731,970, filed on Sep. 16, 2018 and U.S. provisional Application No. 62/822,868, filed on Mar. 23, 2019, and U.S. provisional Application No. 62/822,775, filed on Mar. 22, 2019, All of the aforementioned patent applications are hereby incorporated by reference in their entireties.

TECHNICAL FIELD

The present disclosure relates to the technical field of image and/or video coding and decoding, and in particular to method and apparatus for intra/inter prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modem day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes.

The intra mode coding scheme currently described in BMS is considered complex and a disadvantage of non-selected mode set is that the index list is always constant and not adaptive based on the current block properties (for e.g. its neighboring blocks INTRA modes).

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to a first aspect, the present disclosure relates to a method for intra-prediction of a current block in video encoding or decoding, wherein the method comprises: performing intra-prediction processing of the current block according to a directional intra-prediction mode, comprising reference sample filtering or subpixel interpolation filtering applied to reference samples in one or more reference blocks, wherein the directional intra-prediction mode is classified into one of the following groups: (A) vertical or horizontal modes, (B) directional modes including diagonal modes that represent angles which are multiples of 45 degrees, (C) remaining directional modes; if the directional intra-prediction mode is classified as belonging to group B, a reference sample filter is applied to the reference samples; if the directional intra-prediction mode is classified as belonging to group C, an intra reference sample interpolation filter is applied to the reference samples.

In an embodiment, if the directional intra prediction mode is classifies as belonging to group A, no filter is applied to the reference samples to generate an intra-predictor.

In an embodiment, if the directional intra-prediction mode is classified as belonging to group B, the reference sample filter is applied to the reference samples to copy filtered values into an intra-predictor according to the directional intra-prediction mode; and if the directional intra-prediction mode is classified as belonging to group C, the intra reference sample interpolation filter is applied to the reference samples to generate a predicted sample that falls into a fractional or integer position between the reference samples according to the directional intra-prediction mode.

In an embodiment, the reference sample filter or the intra-prediction processing is a 3-tap filter.

For example, the reference sample filter of the intra-prediction processing is 3-tap filter of [1, 2, 1].

In an embodiment, an interpolation filter of the intra-prediction processing for a given subpixel offset is selected from a set of filters, wherein one of which is the same as a filter for an inter-prediction process.

In an embodiment, the interpolation filter has length of 4 taps and precision of its coefficient of 6 bits.

In an embodiment, group B further comprises wide-angle integer-slope modes.

For example, a wide-angle integer-slope mode is a directional intra-prediction mode other than horizontal, vertical and diagonal, where reference sample positions for each predicted sample of the current block is non-fractional.

In an embodiment, group B further comprises intra-prediction modes for which a value of an intra-prediction angle parameter is a non-zero multiple of 32.

In an embodiment, group B comprises one or all of the intra-prediction modes: [−14, −12, −10, −6, 2, 34, 66, 72, 76, 78, 80].

According to a second aspect, the present disclosure relates to an apparatus for intra-prediction of a current block in video encoding or decoding, wherein the apparatus comprises processing circuitry configured to perform intra-prediction processing of the current block according to a directional intra-prediction mode, comprising reference sample filtering or subpixel interpolation filtering applied to reference samples in one or more reference blocks, wherein the directional intra-prediction mode is classified into one of the following groups: (A) vertical or horizontal modes, (B) directional modes including diagonal modes that represent angles which are multiples of 45 degrees, (C) remaining directional modes; if the directional intra-prediction mode is classified as belonging to group B, a reference sample filter is applied to the reference samples; if the directional intra-prediction mode is classified as belonging to group C, an intra reference sample interpolation filter is applied to the reference samples.

Further features and implementation forms of the apparatus according to the second aspect of the disclosure correspond to the features and implementation forms of the apparatus according to the first aspect of the disclosure.

According to a third aspect, the present disclosure relates to a computer program product comprising program code for performing any one of the above-described methods when executed on a computer or processor.

Details of one or more embodiments are set forth in the accompanying drawings and the description below. Other features, objects, and advantages will be apparent from the description, drawings, and claims.

BRIEF DESCRIPTION OF DRAWINGS

The following embodiments are described in more detail with reference to the attached figures and drawings, in which.

DETAILED DESCRIPTION OF EMBODIMENTS

Figure 1:
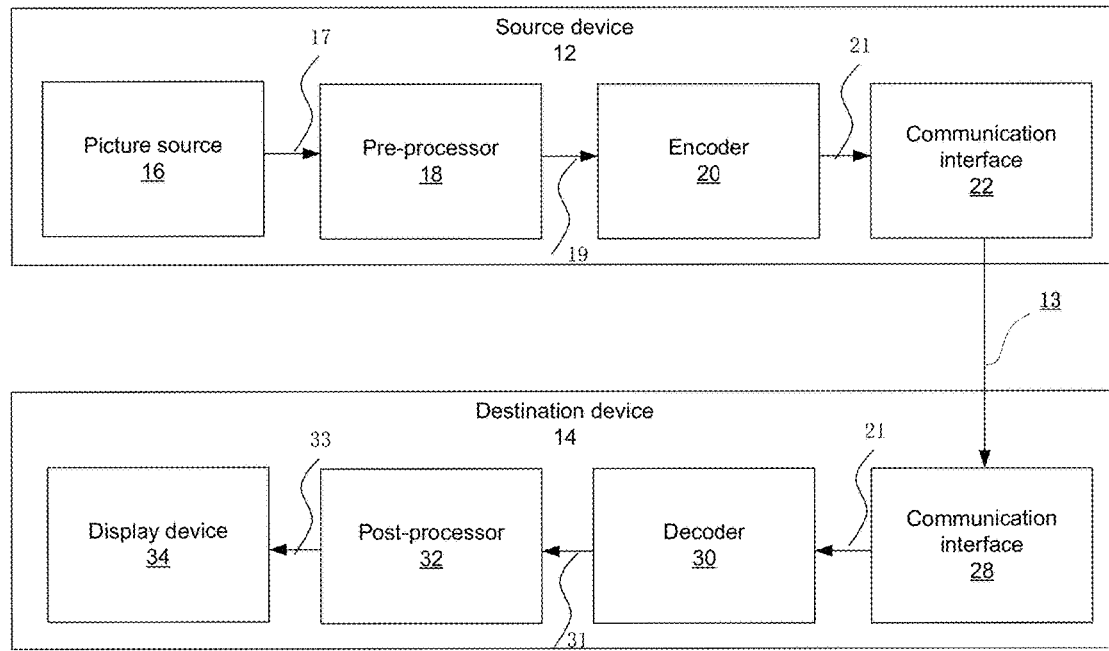
FIG. 1 is a block diagram showing an example of a video coding system configured to implement embodiments of the disclosure.

In the following description, reference is made to the accompanying drawings, which form part of the disclosure, and in which are shown, by way of illustration, specific aspects in which the disclosure may be placed. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1 is a conceptional or schematic block diagram illustrating an example coding system 10, e.g. a video coding system that may utilize techniques of this present application (present disclosure). Encoder 20 (e.g. Video encoder 20) and decoder 30 (e.g. video decoder 30) of video coding system represent examples of devices that may be configured to perform techniques in accordance with various examples described in the present application. As shown in FIG. 1, the coding system comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors.

Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, the video coding system illustrated in FIG. 1 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
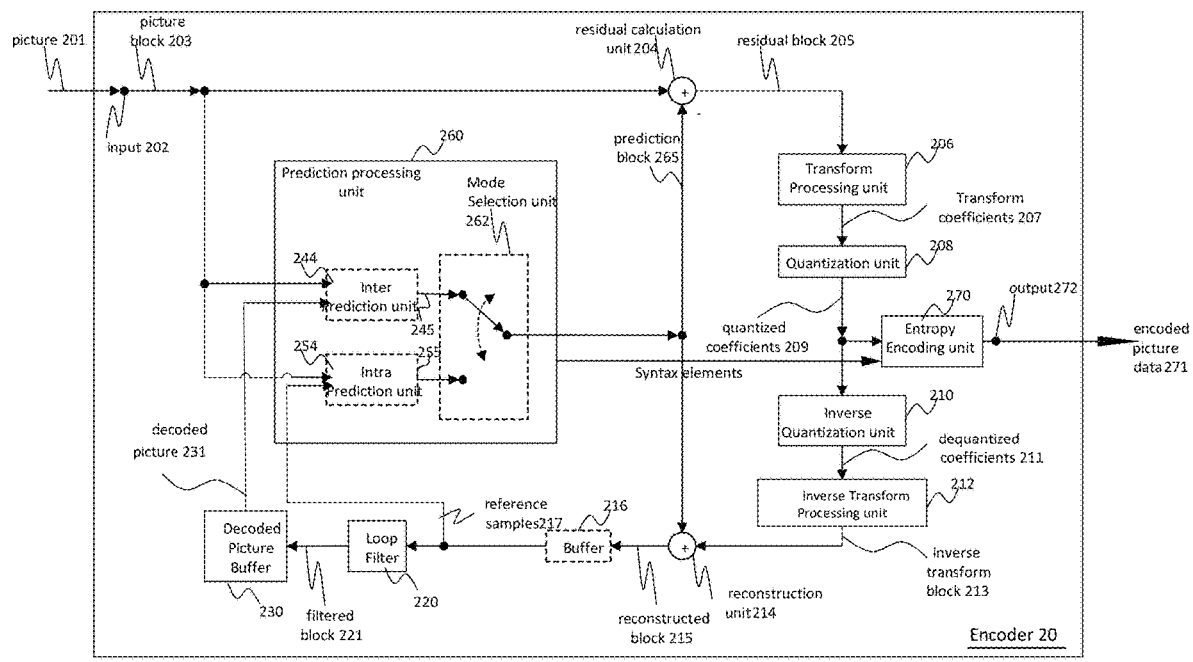
FIG. 2 is a block diagram showing an example of a video encoder configured to implement embodiments of the disclosure.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
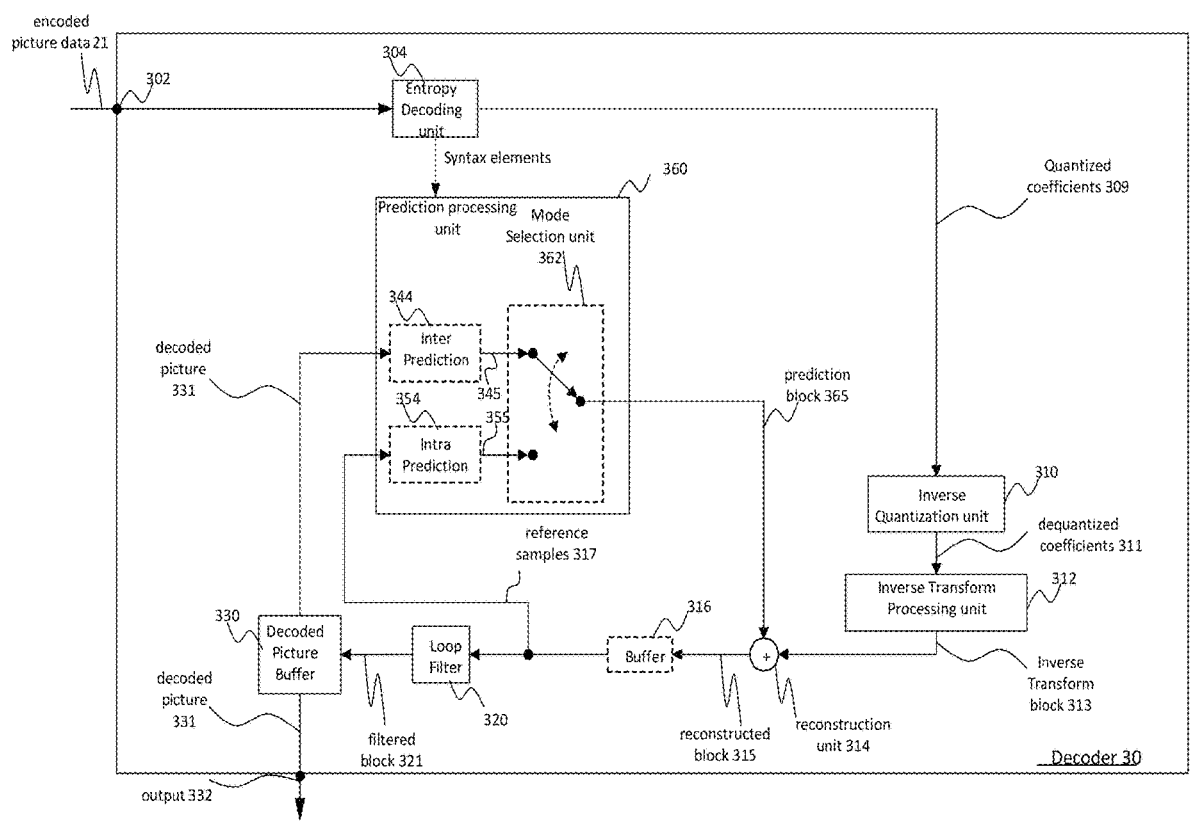
FIG. 3 is a block diagram showing an example structure of a video decoder configured to implement embodiments of the disclosure.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

Embodiments of the video encoder 20 may comprise a picture partitioning unit (not depicted in FIG. 2) configured to partition the picture into a plurality of (typically non-overlapping) picture blocks. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

Like the picture, the picture block again is or can be regarded as a two-dimensional array or matrix of samples with intensity values (sample values), although of smaller dimension than the picture. In other words, the block may comprise, e.g., one sample array (e.g. a luma array in case of a monochrome picture, or a luma or chroma array in case of a color picture) or three sample arrays (e.g. a luma and two chroma arrays in case of a color picture) or any other number and/or kind of arrays depending on the color format applied. The number of samples in horizontal and vertical direction (or axis) of the block define the size of block.

Accordingly, a block may, for example, an M×N (M-column by N-row) array of samples, or an M×N array of transform coefficients.

Embodiments of the video encoder as shown in FIG. 2 may be configured to encode the picture block by block, e.g. the encoding and prediction is performed per block.

Embodiments of the video encoder as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 20 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Embodiments of the video decoder as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

It should be understood that, in the encoder and the decoder, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

Figure 4:
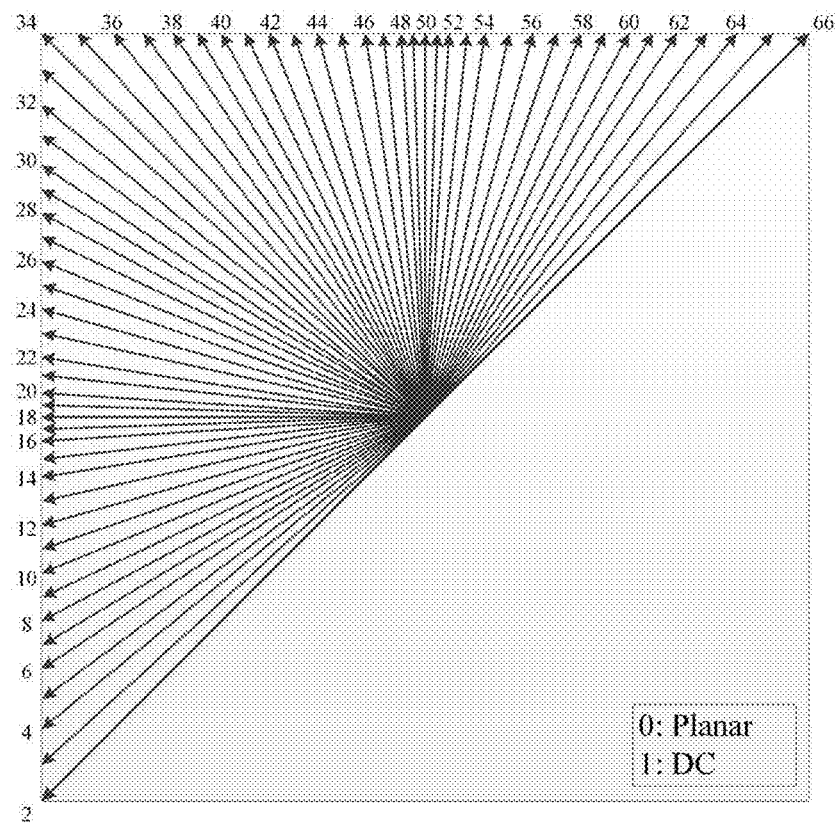
FIG. 4 shows a schematic diagram illustrating 67 intra prediction modes.

According to the HEVC/H.265 standard, 35 intra prediction modes are available. This set contains the following modes: planar mode (the intra prediction mode index is 0), DC mode (the intra prediction mode index is 1), and directional (angular) modes that cover the 180° range and have the intra prediction mode index value range of 2 to 34. To capture the arbitrary edge directions present in natural video, the number of directional intra modes is extended from 33, as used in HEVC, to 65. The additional directional modes are shown in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

FIG. 4 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 4 refers to index 2 and the numbering of the indices being incremented until index 66 being the top right most angular mode of FIG. 4.

Video coding schemes such as H.264/AVC and HEVC are designed along the successful principle of block-based hybrid video coding. Using this principle, a picture is first partitioned into blocks and then each block is predicted by using intra-picture or inter-picture prediction.

As used herein, the term "block" may a portion of a picture or a frame. For convenience of description, embodiments of the disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) uses 35 Intra modes whereas the BMS (Benchmark Set) uses 67 Intra modes. Intra-prediction is a mechanism used in many video coding frameworks to increase compression efficiency in the cases where only a given frame can be involved.

As shown in FIG. 4, the latest version of JEM has some modes corresponding to skew intra prediction directions. For any of these modes, to predict samples within a block interpolation of a set of neighboring reference samples should be performed, if a corresponding position within a block side is fractional. HEVC and VVC uses linear interpolation between two adjacent reference samples. JEM uses more sophisticated 4-tap interpolation filters. Filter coefficients are selected to be either Gaussian or Cubic ones depending on the width or on the height value. Decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Specific filter coefficient used in JEM are given in Table 1. Predicted sample is calculated by convoluting with coefficients selected from Table 1 according to subpixel offset and filter type as follows:

$$s(x) = \left( \sum_{i=0}^{i<4} (ref_{i+x} \cdot c_i) + 128 \right) \gg 8$$

In this equation, ">>" indicates a bitwise shift-right operation.

If Cubic filter is selected, predicted sample is further clipped to the allowed range of values, that is either defined in SPS or derived from the bit depth of the selected component.

TABLE 1

Intra prediction interpolation filters

| | Cubic filter | | | | Gauss filter | | | |
|---|---|---|---|---|---|---|---|---|
| Subpixel offset | $c_0$ | $c_1$ | $c_2$ | $c_3$ | $c_0$ | $c_1$ | $c_2$ | $c_3$ |
| 0 (integer) | 0 | 256 | 0 | 0 | 47 | 161 | 47 | 1 |
| 1 | −3 | 252 | 8 | −1 | 43 | 161 | 51 | 1 |
| 2 | −5 | 247 | 17 | −3 | 40 | 160 | 54 | 2 |
| 3 | −7 | 242 | 25 | −4 | 37 | 159 | 58 | 2 |
| 4 | −9 | 236 | 34 | −5 | 34 | 158 | 62 | 2 |
| 5 | −10 | 230 | 43 | −7 | 31 | 156 | 67 | 2 |
| 6 | −12 | 224 | 52 | −8 | 28 | 154 | 71 | 3 |
| 7 | −13 | 217 | 61 | −9 | 26 | 151 | 76 | 3 |
| 8 | −14 | 210 | 70 | −10 | 23 | 149 | 80 | 4 |
| 9 | −15 | 203 | 79 | −11 | 21 | 146 | 85 | 4 |
| 10 | −16 | 195 | 89 | −12 | 19 | 142 | 90 | 5 |
| 11 | −16 | 187 | 98 | −13 | 17 | 139 | 94 | 6 |
| 12 | −16 | 179 | 107 | −14 | 16 | 135 | 99 | 6 |
| 13 | −16 | 170 | 116 | −14 | 14 | 131 | 104 | 7 |
| 14 | −17 | 162 | 126 | −15 | 13 | 127 | 108 | 8 |
| 15 | −16 | 153 | 135 | −16 | 11 | 123 | 113 | 9 |
| 16 (half-pel) | −16 | 144 | 144 | −16 | 10 | 118 | 118 | 10 |
| 17 | −16 | 135 | 153 | −16 | 9 | 113 | 123 | 11 |
| 18 | −15 | 126 | 162 | −17 | 8 | 108 | 127 | 13 |
| 19 | −14 | 116 | 170 | −16 | 7 | 104 | 131 | 14 |
| 20 | −14 | 107 | 179 | −16 | 6 | 99 | 135 | 16 |
| 21 | −13 | 98 | 187 | −16 | 6 | 94 | 139 | 17 |
| 22 | −12 | 89 | 195 | −16 | 5 | 90 | 142 | 19 |
| 23 | −11 | 79 | 203 | −15 | 4 | 85 | 146 | 21 |
| 24 | −10 | 70 | 210 | −14 | 4 | 80 | 149 | 23 |

TABLE 1-continued

Intra prediction interpolation filters

| | Cubic filter | | | | Gauss filter | | | |
|---|---|---|---|---|---|---|---|---|
| Subpixel offset | $c_0$ | $c_1$ | $c_2$ | $c_3$ | $c_0$ | $c_1$ | $c_2$ | $c_3$ |
| 25 | −9 | 61 | 217 | −13 | 3 | 76 | 151 | 26 |
| 26 | −8 | 52 | 224 | −12 | 3 | 71 | 154 | 28 |
| 27 | −7 | 43 | 230 | −10 | 2 | 67 | 156 | 31 |
| 28 | −5 | 34 | 236 | −9 | 2 | 62 | 158 | 34 |
| 29 | −4 | 25 | 242 | −7 | 2 | 58 | 159 | 37 |
| 30 | −3 | 17 | 247 | −5 | 2 | 54 | 160 | 40 |
| 31 | −1 | 8 | 252 | −3 | 1 | 51 | 161 | 43 |

The motion compensation process also utilizes filtering to predict sample values when displacements of the pixels of the reference block are fractional. In JEM, 8-tap filtering is used for luminance component and 4-tap length filtering is used for chrominance component. The motion interpolation filter is firstly applied horizontally, and the output of horizontal filtering is further filtered vertically. Coefficients of a 4-tap chrominance filter are given in Table 2.

TABLE 2

Chrominance motion interpolation filter coefficients

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

The state-of-the-art video coding solutions uses different interpolation filters in intra- and inter-prediction. Particularly, FIGS. 5 to 7 show different examples of interpolation filters.

Figure 5:
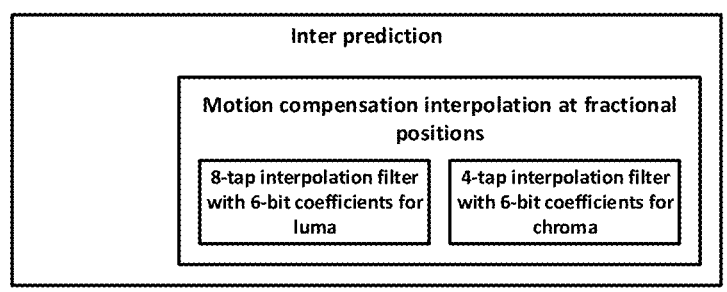
FIG. 5 illustrates a first usage example of different interpolation filters in intra and inter prediction.
Figure 5:
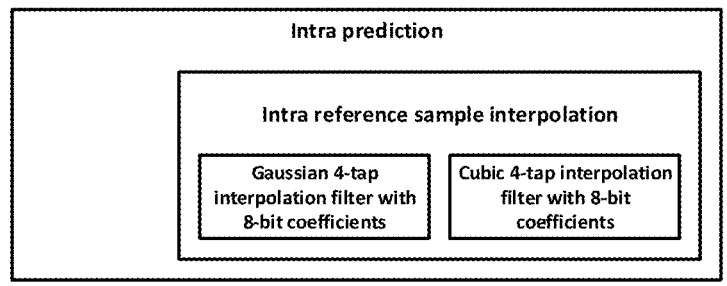

FIG. 5 schematically illustrates the interpolation filters as used in JEM. As can be seen from the figure, for motion compensation interpolation one or more fractional positions in inter prediction, an 8-tap interpolation filter with 6-bit coefficients is used for luma and a 4-tap interpolation filter with 6-bit coefficients is used for chroma. Further, for intra reference sample interpolation inn intra prediction, a Gaussian 4-tap interpolation filter with 8-bit coefficients or a Cubic 4-tap interpolation filter with 8-bit coefficients is used.

Figure 6:
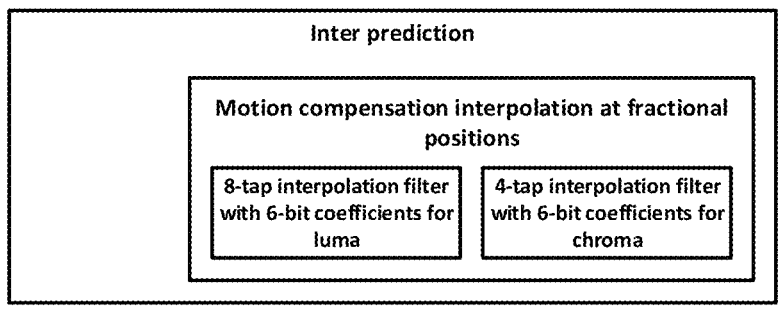
FIG. 6 illustrates a second usage example of different interpolation filters in intra and inter prediction.
Figure 6:
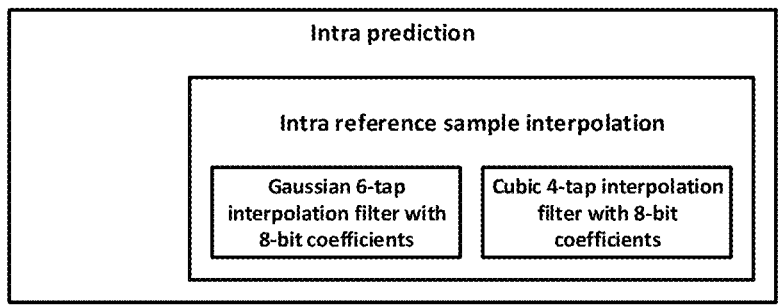

FIG. 6 schematically illustrates the interpolation filters proposed for Core Experiment CE3 3.1.3 (G. Van der Auwera et al: JVET K1023 "Description of Core Experiment 3 (CE3): Intra Prediction and Mode Coding", version 2). As can be seen from the figure, for motion compensation interpolation one or more fractional positions in inter prediction, an 8-tap interpolation filter with 6-bit coefficients is used for luma and a 4-tap interpolation filter with 6-bit coefficients is used for chroma. Further, for intra reference sample interpolation inn intra prediction, a Gaussian 6-tap interpolation filter with 8-bit coefficients or a Cubic 4-tap interpolation filter with 8-bit coefficients is used.

Figure 7:
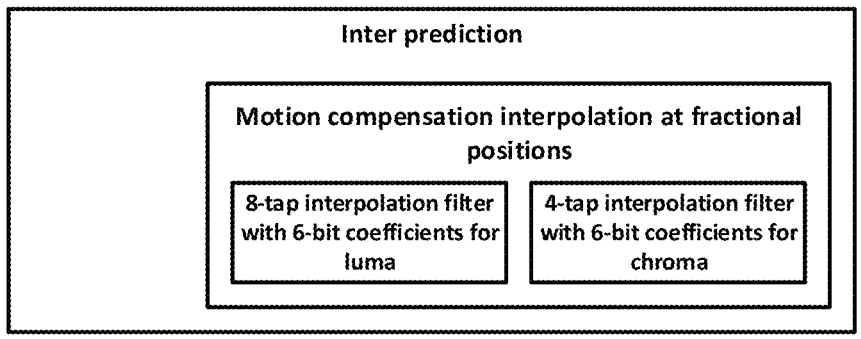
FIG. 7 illustrates a third usage example of different interpolation filters in intra and inter prediction.
Figure 7:
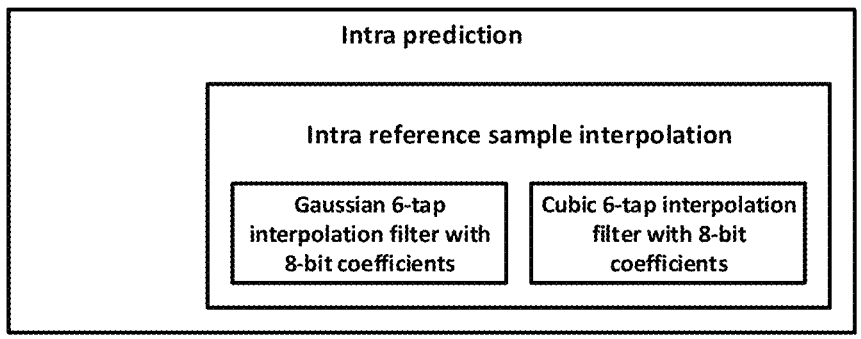

FIG. 7 schematically illustrates the interpolation filters proposed in G. Van der Auwera et al.: JVET K0064 "CE3-related: On MDIS and intra interpolation filter switching", version 2. As can be seen from the figure, for motion compensation interpolation one or more fractional positions in inter prediction, an 8-tap interpolation filter with 6-bit coefficients is used for luma and a 4-tap interpolation filter with 6-bit coefficients is used for chroma. Further, for intra reference sample interpolation inn intra prediction, a Gaussian 6-tap interpolation filter with 8-bit coefficients or a Cubic 6-tap interpolation filter with 8-bit coefficients is used.

According to this disclosure, the look-up tables and hardware modules of chroma motion compensation sub-pel filter is reused for interpolating pixel values within an intra predictor, if they fall into fractional positions between reference samples. Since the same hardware is intended to be in use for both inter- and intra-prediction, the precision of filter coefficients should be consistent, i.e. the number of bits to represent filter coefficients for intra reference sample interpolation should be aligned with the coefficient precision of motion sub-pel motion compensation interpolation filtering.

Figure 8:
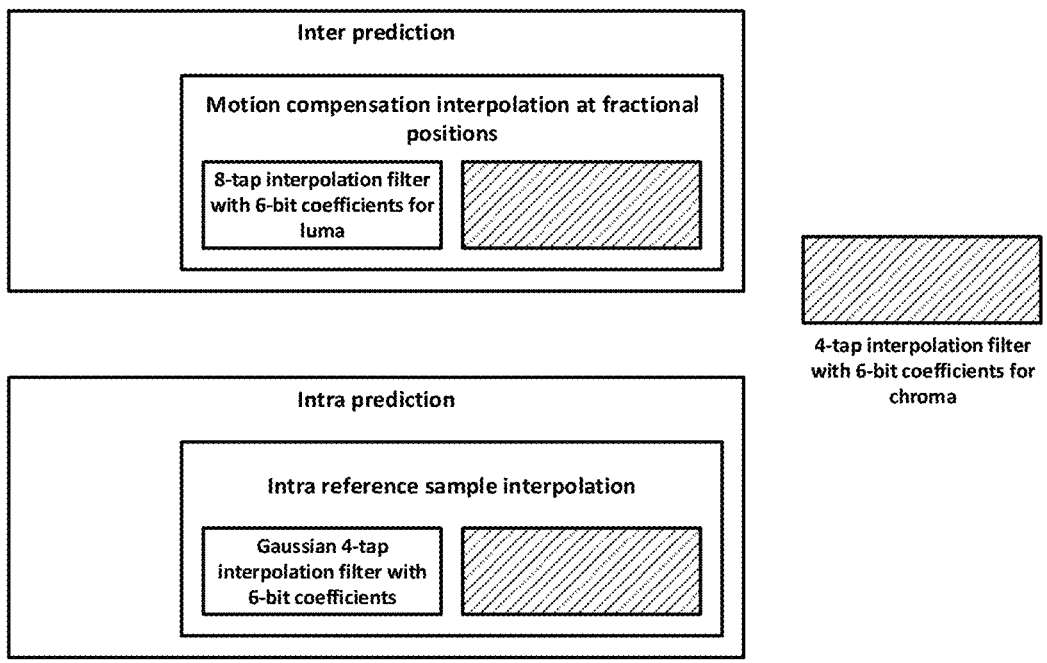
FIG. 8 illustrates usage of a common interpolation filter to be used for intra and inter predicted samples.

FIG. 8 illustrates the idea of the provided disclosure. The dashed "4-tap interpolation filter with 6-bit coefficients for chroma" (further referred to as "Unified intra/inter filter") may be used for both processes: interpolation of intra- and inter-predicted samples.

Figure 9:
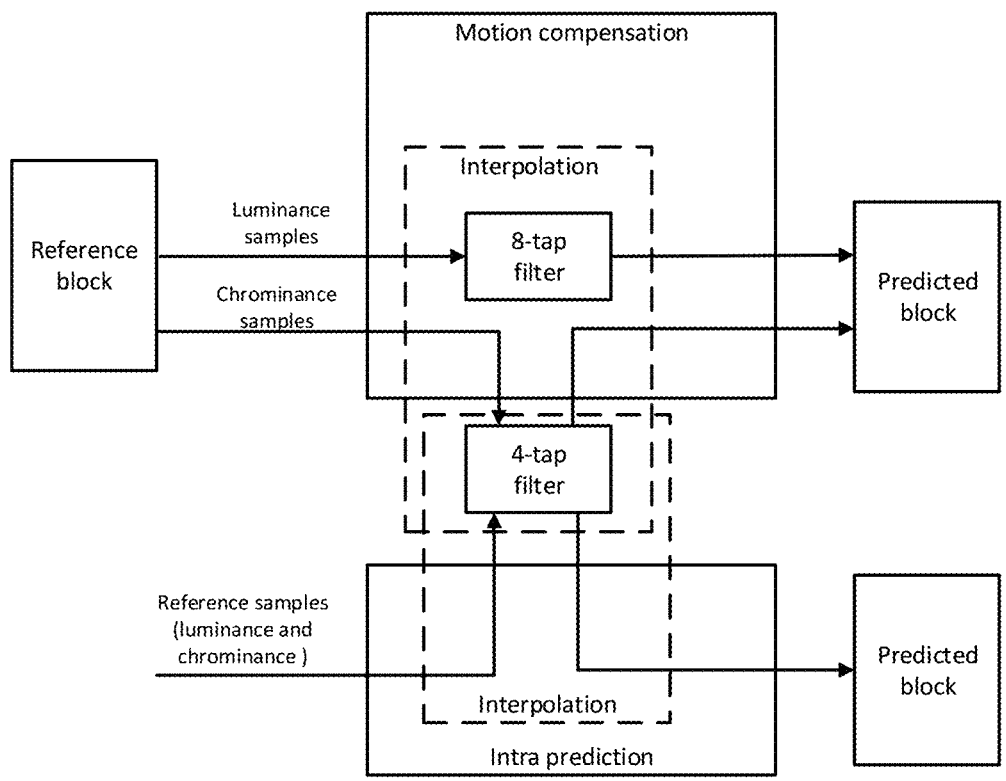
FIG. 9 illustrates an embodiment using a filtering module being engaged in prediction of chrominance samples in motion compensation and predicting luminance and chrominance samples when performing intra prediction.

An embodiment that utilizes this design is shown in FIG. 9. In this implementation, a filtering module is being implemented as a separate unit that is being engaged in both: prediction of chrominance samples in motion compensation and predicting luminance and chrominance samples when performing intra-prediction. In this implementation, hardware filtering part is being used in both intra- and inter-prediction processes.

Figure 10:
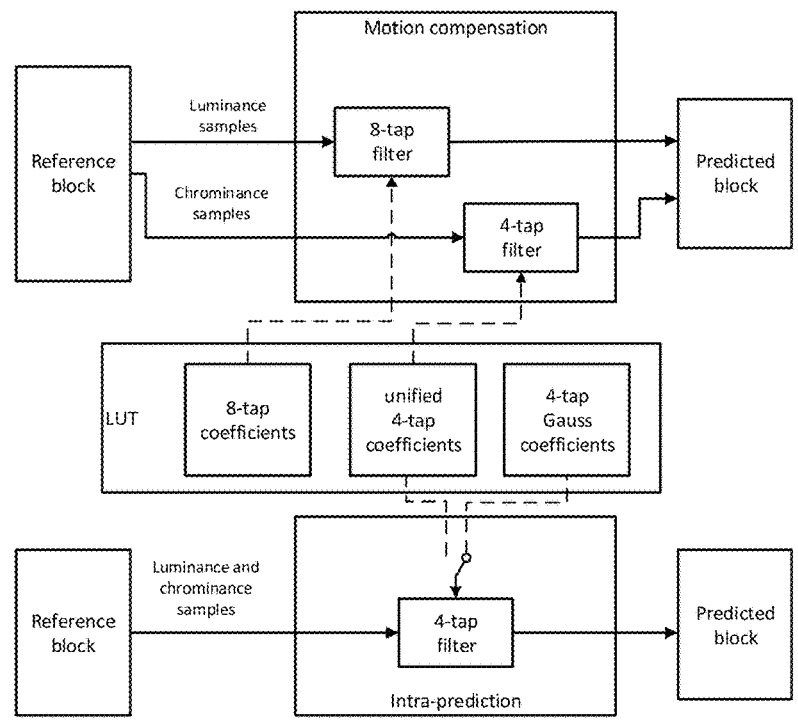
FIG. 10 illustrates an embodiment, wherein hardware filtering modules loads coefficients stored in a ROM.

Another embodiment shows implementation when only LUTs of filter coefficients are reused, as illustrated in FIG. 10. In this embodiment, hardware filtering modules loads coefficients from LUTs stored in ROM. A switch shown in intra prediction process determines the filter type being used depending on the length of the main side selected for intra prediction process.

An embodiment of the provided application may use the following coefficients (see Table 3).

TABLE 3

Intra- and Inter- interpolating filters

| Subpixel offset | Unified intra/inter filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 14 | 29 | 18 | 3 |
| 3 | −2 | 60 | 7 | −1 | 14 | 29 | 18 | 3 |
| 4 | −2 | 58 | 10 | −2 | 14 | 28 | 18 | 4 |
| 5 | −3 | 57 | 12 | −2 | 13 | 28 | 19 | 4 |
| 6 | −4 | 56 | 14 | −2 | 12 | 28 | 20 | 4 |
| 7 | −4 | 55 | 15 | −2 | 12 | 27 | 20 | 5 |
| 8 | −4 | 54 | 16 | −2 | 11 | 27 | 21 | 5 |
| 9 | −5 | 53 | 18 | −2 | 11 | 27 | 21 | 5 |
| 10 | −6 | 52 | 20 | −2 | 10 | 26 | 22 | 6 |
| 11 | −6 | 49 | 24 | −3 | 10 | 26 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 (half-pel) | −4 | 36 | 36 | −4 | 7 | 25 | 25 | 7 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 26 | 10 |
| 22 | −2 | 20 | 52 | −6 | 6 | 22 | 26 | 10 |
| 23 | −2 | 18 | 53 | −5 | 5 | 21 | 27 | 11 |
| 24 | −2 | 16 | 54 | −4 | 5 | 21 | 27 | 11 |
| 25 | −2 | 15 | 55 | −4 | 5 | 20 | 27 | 12 |
| 26 | −2 | 14 | 56 | −4 | 4 | 20 | 28 | 12 |
| 27 | −2 | 12 | 57 | −3 | 4 | 19 | 28 | 13 |
| 28 | −2 | 10 | 58 | −2 | 4 | 18 | 28 | 14 |
| 29 | −1 | 7 | 60 | −2 | 3 | 18 | 29 | 14 |
| 30 | 0 | 4 | 62 | −2 | 3 | 18 | 29 | 14 |
| 31 | 0 | 2 | 63 | −1 | 3 | 17 | 29 | 15 |

An intra-predicted sample may be calculated by convolution with coefficients selected from Table 1 according to subpixel offset and filter type as follows:

$$s(x) = \left( \sum_{i=0}^{i<4} (ref_{i+x} \cdot c_i) + 32 \right) \gg 6$$

In this equation, ">>" indicates a bitwise shift-right operation.

If "Unified intra/inter filter" filter is selected, predicted sample is further clipped to the allowed range of values, that is either defined in SPS or derived from the bit depth of the selected component.

For intra reference sample interpolation and sub-pel motion compensation interpolation, the same filter can be used to reuse hardware modules and to reduce the total size of required memory, The precision of filter coefficients used for intra reference sample interpolation in addition to the reused filter should be aligned with the precision of coefficients of the above-mentioned reused filter.

Note that luma processing in motion compensation does not necessarily use 8-tap filtering but may also operate on 4-tap filtering. In this case, a 4-tap filter could be selected to be unified.

The method may be applied in different parts of intra-prediction process that may involve interpolation. Particularly, when extending main reference samples, side reference samples may also be filtered using unified interpolation filter (see V. Drugeon: JVET-K0211 "CE3: DC mode without divisions and modifications to intra filtering (Tests 1.2.1, 2.2.2 and 2.5.1)" version 1 for details).

Intra block copy operations also involve an interpolation operation that may use the proposed method (see [Xiaozhong Xu, Shan Liu, Tzu-Der Chuang, Yu-Wen Huang, Shawmin Lei, Krishnakanth Rapaka, Chao Pang, Vadim Seregin, Ye-Kui Wang, Marta Karczewicz: Intra Block Copy in HEVC Screen Content Coding Extensions. IEEE J. Emerg. Sel. Topics Circuits Syst. 6(4): 409-419 (2016)] for Intra block copy description). Provided is method for intra prediction, the method comprising: using an interpolation filter for chrominance component as the interpolation filter for intra prediction of a block.

In an embodiment, a look-up table of the interpolation filter for chrominance component is the same as a look-up table of the interpolation filter for intra prediction.

In an embodiment, a look-up table of the interpolation filter for chrominance component is not the same as a look-up table of the interpolation filter for intra prediction.

In an embodiment, the interpolation filter is a 4 tap filter.

In an embodiment, the look-up table of the interpolation filter for chrominance component is

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Provided is a method for intra prediction, the method comprising: selecting an interpolation filter from a set of interpolation filters for intra prediction of a block.

In an embodiment, the set of interpolation filters comprises a Gauss filter and a Cubic filter.

In an embodiment, a look-up table of the selected interpolation filter is the same as a look-up table of the interpolation filter for chrominance component.

In an embodiment, the selected interpolation filter is a 4-tap filter.

In an embodiment, the selected interpolation filter is a Cubic filter.

In an embodiment, a look-up table of the selected interpolation filter is

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

In an embodiment, a look-up table of the selected interpolation filter is

| Subpixel offset | $c_0$ | $c_1$ | $c_2$ | $c_3$ |
|---|---|---|---|---|
| 0 (integer) | 16 | 32 | 16 | 0 |
| 1 | 15 | 29 | 17 | 3 |
| 2 | 14 | 29 | 18 | 3 |
| 3 | 14 | 29 | 18 | 3 |
| 4 | 14 | 28 | 18 | 4 |
| 5 | 13 | 28 | 19 | 4 |
| 6 | 12 | 28 | 20 | 4 |
| 7 | 12 | 27 | 20 | 5 |
| 8 | 11 | 27 | 21 | 5 |
| 9 | 11 | 27 | 21 | 5 |
| 10 | 10 | 26 | 22 | 6 |
| 11 | 10 | 26 | 22 | 6 |
| 12 | 9 | 26 | 23 | 6 |
| 13 | 9 | 26 | 23 | 6 |
| 14 | 8 | 25 | 24 | 7 |
| 15 | 8 | 25 | 24 | 7 |
| 16 (half-pel) | 7 | 25 | 25 | 7 |
| 17 | 7 | 24 | 25 | 8 |
| 18 | 7 | 24 | 25 | 8 |
| 19 | 6 | 23 | 26 | 9 |
| 20 | 6 | 23 | 26 | 9 |
| 21 | 6 | 22 | 26 | 10 |
| 22 | 6 | 22 | 26 | 10 |
| 23 | 5 | 21 | 27 | 11 |
| 24 | 5 | 21 | 27 | 11 |
| 25 | 5 | 20 | 27 | 12 |
| 26 | 4 | 20 | 28 | 12 |
| 27 | 4 | 19 | 28 | 13 |

-continued

| Subpixel offset | $c_0$ | $c_1$ | $c_2$ | $c_3$ |
|---|---|---|---|---|
| 28 | 4 | 18 | 28 | 14 |
| 29 | 3 | 18 | 29 | 14 |
| 30 | 3 | 18 | 29 | 14 |
| 31 | 3 | 17 | 29 | 15 |

Provided is an encoder comprising processing circuitry for carrying out any one of the above methods.

Provided is a decoder comprising processing circuitry for carrying out any one of the above methods.

Provided is a computer program product comprising a program code for performing any one of the above methods.

Provided is a decoder, comprising: one or more processors; and a non-transitory computer-readable storage medium coupled to the processors and storing programming for execution by the processors, wherein the programming, when executed by the processors, configures the decoder to carry out any one of the above methods.

Provided is an encoder, comprising: one or more processors; and a non-transitory computer-readable storage medium coupled to the processors and storing programming for execution by the processors, wherein the programming, when executed by the processors, configures the encoder to carry out any one of the above methods.

For instance, it is understood that a disclosure in connection with a described method may also hold true for a corresponding device or system configured to perform the method and vice versa. For example, if a specific method operation is described, a corresponding device may include a unit to perform the described method operation, even if such unit is not explicitly described or illustrated in the figures. Further, it is understood that the features of the various exemplary aspects described herein may be combined with each other, unless specifically noted otherwise.

A method for aspect-ratio dependent filtering for intra-prediction is provided, the method comprising:

selecting an interpolation filter for a block to be predicted depending on an aspect ratio of the block.

In an example, the interpolation filter is selected depending on a direction for thresholding an intra prediction mode of the block to be predicated.

In an example, the direction corresponds to an angle of main diagonal of the block to be predicted.

In an example, an angle of the direction is calculated as:

$$\alpha_T = \arctan\left(\frac{H}{W}\right),$$

where W, H are width and height of the block to be predicted, respectively.

In an example, the aspect ratio is $R_A = \log_2(W) - \log_2(H)$, where W, H are width and height of the block to be predicted, respectively.

In an example, the angle of main diagonal of the block to be predicted are determined based on the aspect ratio.

In an example, a threshold of an intra prediction mode of the block is determined based on the angle of main diagonal of the block to be predicted.

In an example, the interpolation filter is selected depending on which side the reference samples being used belong to.

In an example, a straight line with an angle corresponding to an intra direction divides the block onto two areas.

In an example, the reference samples belonging to different areas are predicted using different interpolation filters.

In an example, the filter includes a cubic interpolation filter or a gauss interpolation filter.

In one implementation form of the present application, a frame is the same as a picture.

In one implementation form of the present disclosure, a value corresponding to the VER_IDX is 50; a value corresponding to the HOR_IDX is 18; a value corresponding to the VDIA_IDX is 66, and this value may be the largest value in the values corresponding to the angular modes; the value 2 which corresponding to the intra mode 2 may be the smallest value in the values corresponding to the angular modes; a value corresponding to the DIA_IDX is 34.

The present disclosure targets improvement in the intra mode signaling scheme. In the present disclosure, a video decoding method and a video decoder are proposed.

In another aspect of the present disclosure, a decoder comprising processing circuitry is disclosed configured for carrying out the above decoding methods.

In another aspect of the present disclosure, a computer program product is provided which comprises a program code for performing any one of the above decoding methods.

In another aspect of the present disclosure, a decoder for decoding video data is provided, the decoder comprising: one or more processors; and a non-transitory computer-readable storage medium coupled to the processors and storing programming for execution by the processors, wherein the programming, when executed by the processors, configures the decoder to carry out any one of the above decoding methods.

The processing circuitry can be implemented in hardware, or in a combination of hardware and software, for example by a software programmable processor or the like.

The processing circuitry can be implemented in hardware, or in a combination of hardware and software, for example by a software programmable processor or the like.

Figure 11:
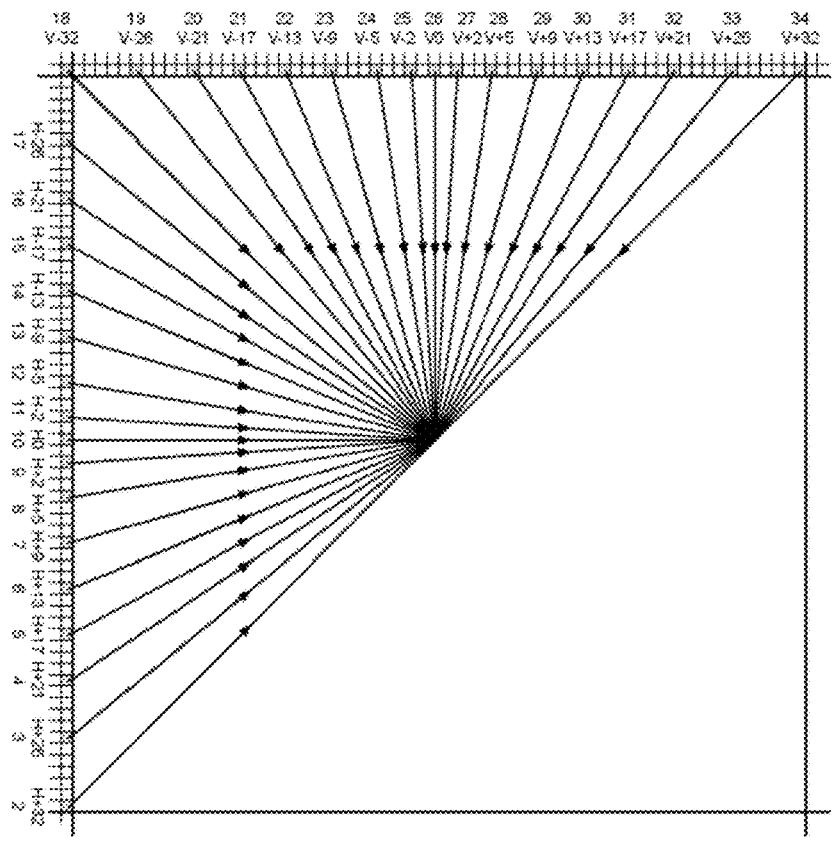
FIG. 11 illustrates a schematic diagram of a plurality of intra prediction modes.

FIG. 11 illustrates a schematic diagram of a plurality of intra prediction modes used in the HEVC UIP scheme. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a chroma value for the block matches the luma value for the block. The directional modes may perform predictions based on adjacent blocks as shown in FIG. 11.

H.264/AVC and HEVC specifies that a low-pass filter could be applied to reference samples prior being used in intra prediction process. A decision on whether to use reference sample filter or not is determined by intra prediction mode and block size. These mechanisms may be referred to as Mode Dependent Intra Smoothing (MDIS). There also exists a plurality of methods related to MDIS. For example, the Adaptive Reference Sample Smoothing (ARSS) method may explicitly (i.e. a flag is included into a bitstream) or implicitly (i.e., for example, data hiding is used to avoid putting a flag into a bitstream to reduce signaling overhead) signal whether the prediction samples are filtered. In this case, the encoder may make the decision on smoothing by testing the Rate-Distortion (RD) cost for all potential intra prediction modes.

As shown in FIG. 11, the latest version of JEM (JEM-7.2) has some modes corresponding to skew intra prediction directions. For any of these modes, to predict samples within a block interpolation of a set of neighboring reference samples should be performed, if a corresponding position within a block side is fractional. HEVC and VVC use linear interpolation between two adjacent reference samples. JEM uses more sophisticated 4-tap interpolation filters. Filter coefficients are selected to be either Gaussian or Cubic ones depending on the width or on the height value. A decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main side reference is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Figure 12:
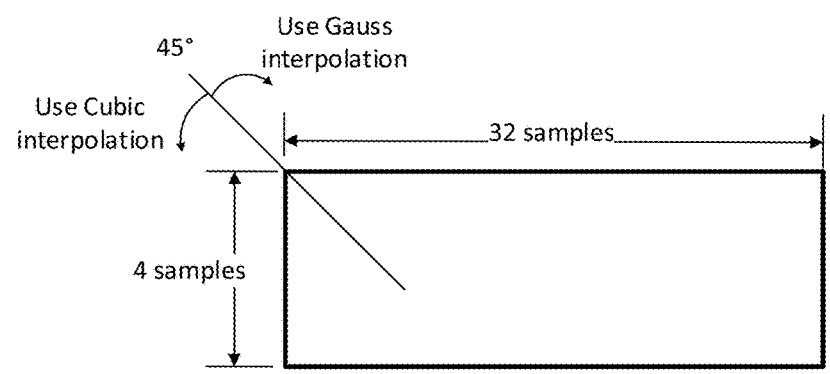
FIG. 12 illustrates an example of interpolation filter selection for modes smaller and greater than diagonal in the case of a non-square block.

An example of interpolation filter selection for modes smaller and greater than diagonal one (denoted as 45°) in the case of 32×4 block is shown in FIG. 12.

Figure 13:
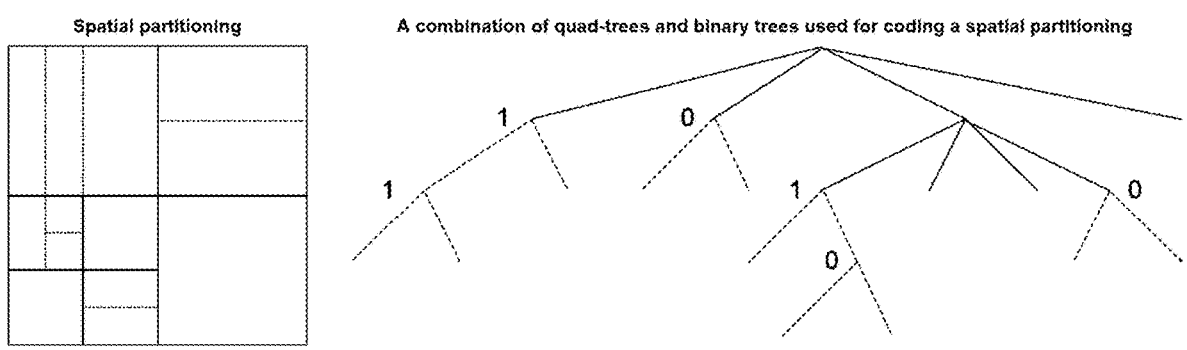
FIG. 13 illustrates Quadtree plus Binary Tree (QTBT) block partitioning.

In VVC, a partitioning mechanism based on both quad-tree and binary tree and known as QTBT is used. As depicted in FIG. 13, QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree.

However, VVC in its current state applies the same filter to the both sides of reference samples (left and top ones). No matter whether a block is oriented vertically or horizontally, a reference sample filter will be the same for both reference sample sides.

Figure 14:
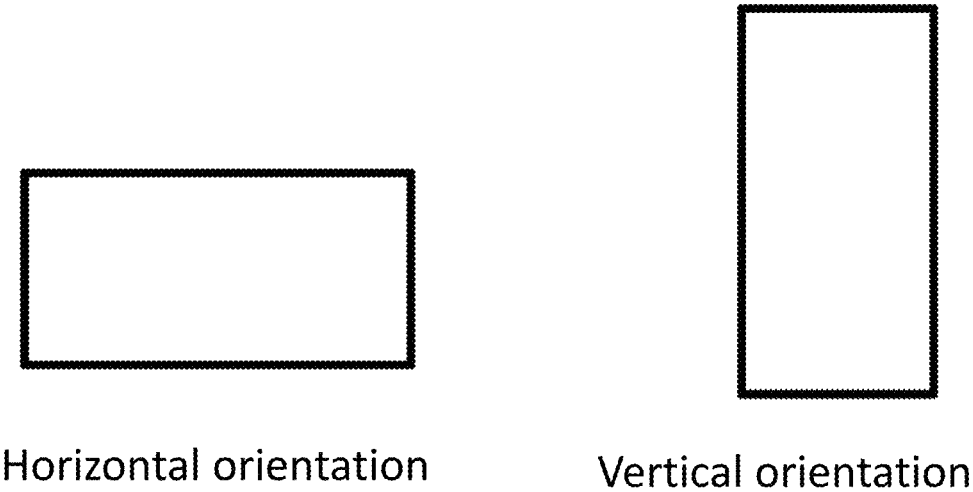
FIG. 14 shows a horizontal and a vertical orientation of a block.

In this document, the terms "vertically oriented block" ("vertical orientation of a block") and "horizontally oriented block" ("horizontal orientation of a block") are applied to rectangular blocks generated by the QTBT framework. These terms have the same meaning as shown in FIG. 14.

The present disclosure provides a mechanism to select different reference sample filters in order to consider orientation of a block. Specifically, width and height of a block are checked independently so that different reference sample filters are applied to reference sample located on different sides of a block to be predicted.

In prior-art review, it was described that interpolation filter selection is harmonized with the decision on main reference side selection. Both of these decisions currently rely on comparison of intra prediction mode with the diagonal (45 degree) direction.

Figure 15:
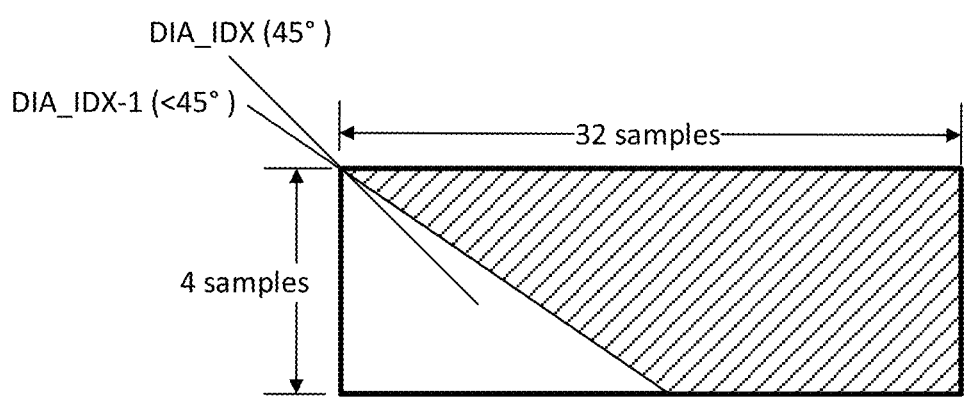
FIG. 15 schematically illustrates selection of an interpolation filter for a non-square block.

However, it could be noticed that this design has a serious flaw for the elongate blocks. From FIG. 15 it could be observed that even if shorter side is selected as the main reference using mode comparison criteria, most of the predicted pixels would still be derived from the reference samples of the longer side (shown as dashed area).

Figure 16:
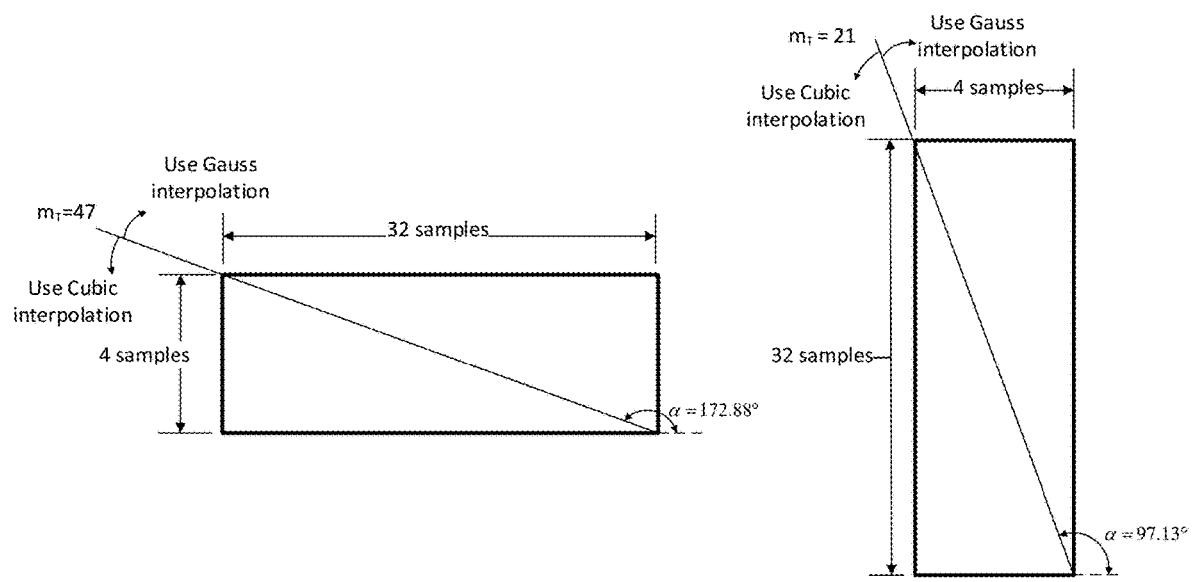
FIG. 16 illustrates an embodiment for reference sample interpolation filter selection for a non-square block.

The present disclosure proposes to use an alternative direction for thresholding an intra prediction mode during interpolation filter selection process. Specifically, the directions correspond to the angle of main diagonal of the block to be predicted. For example, for blocks of size 32×4 and 4×32, threshold mode $m_T$ used to determine reference sample filter is defined as it is shown in FIG. 16.

The specific value of the threshold intra prediction angle could be calculated using the following formula:

$$\alpha_T = \arctan\left(\frac{H}{W}\right),$$

Where W and H are the block width and height, respectively.

Figure 17:
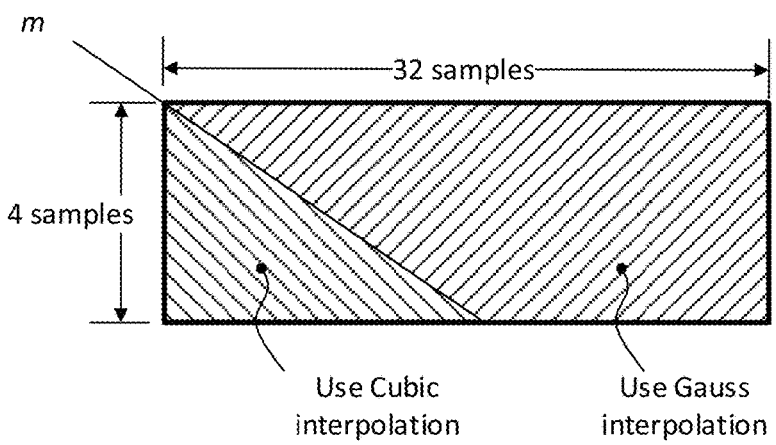
FIG. 17 illustrates an alternative embodiment for reference sample interpolation filter selection for a non-square block.

Another embodiment of the present disclosure is to use different interpolation filters depending on which side the reference samples being used belong to. An example of this determination is shown in FIG. 17.

A straight line with an angle corresponding to intra direction m divides a predicted block onto two areas. Samples belonging to different areas are predicted using different interpolation filters.

Exemplary values of $m_T$ (for the set of intra prediction modes defined in BMS1.0) and corresponding angles are given in Table 4. Angles α are given as shown in FIG. 16.

TABLE 4

Exemplary values of $m_T$ (for the set of intra prediction modes defined in BMS1.0)

| Aspect ratio $RA = \log_2(W) - \log_2(H)$ | Angle of main diagonal α, degrees | Threshold intra prediction mode $m_T$ |
|---|---|---|
| −5 | 81.78 | 19 |
| −4 | 93.57 | 19 |
| −3 | 97.13 | 21 |
| −2 | 104.04 | 23 |
| −1 | 116.57 | 27 |
| 0 | 135.00 | DIA_IDX (34) |
| 1 | 153.44 | 41 |
| 2 | 165.96 | 45 |
| 3 | 172.88 | 47 |
| 4 | 176.42 | 49 |
| 5 | 178.21 | 49 |

Compared to existing technology and solutions, the present disclosure uses samples within a block that are predicted using different interpolation filters, wherein the interpolation filter used to predict a sample is selected according to block shape, orientation being horizontal or vertical, and intra prediction mode angle.

The present disclosure may be applied at the stage of reference sample filtering. In particular, it is possible to determine reference sample smoothing filter using similar rules described above for interpolation filter selection process.

In addition to interpolation filtering, reference sample filtering can be also applied to reference samples immediately before predicting samples within an intra-predictor. The filtered reference samples obtained after reference sample filtering can be used either for copying them into corresponding samples within an intra-predictor according to a selected direction of the intra-prediction mode or for further interpolation filtering. The following filters can be applied to reference samples in this way:

TABLE 5

Exemplary reference sample filters

| Index | Filter length | Filter coefficients |
|---|---|---|
| 0 | 1 | [1] , i.e. by-pass mode is applied as no filtering is performed in this case |
| 1 | 3 | [1, 2, 1] |
| 2 | 5 | [2, 3, 6, 3, 2] |
| 3 | 5 | [1, 4, 6, 4, 1] |

Figure 21:
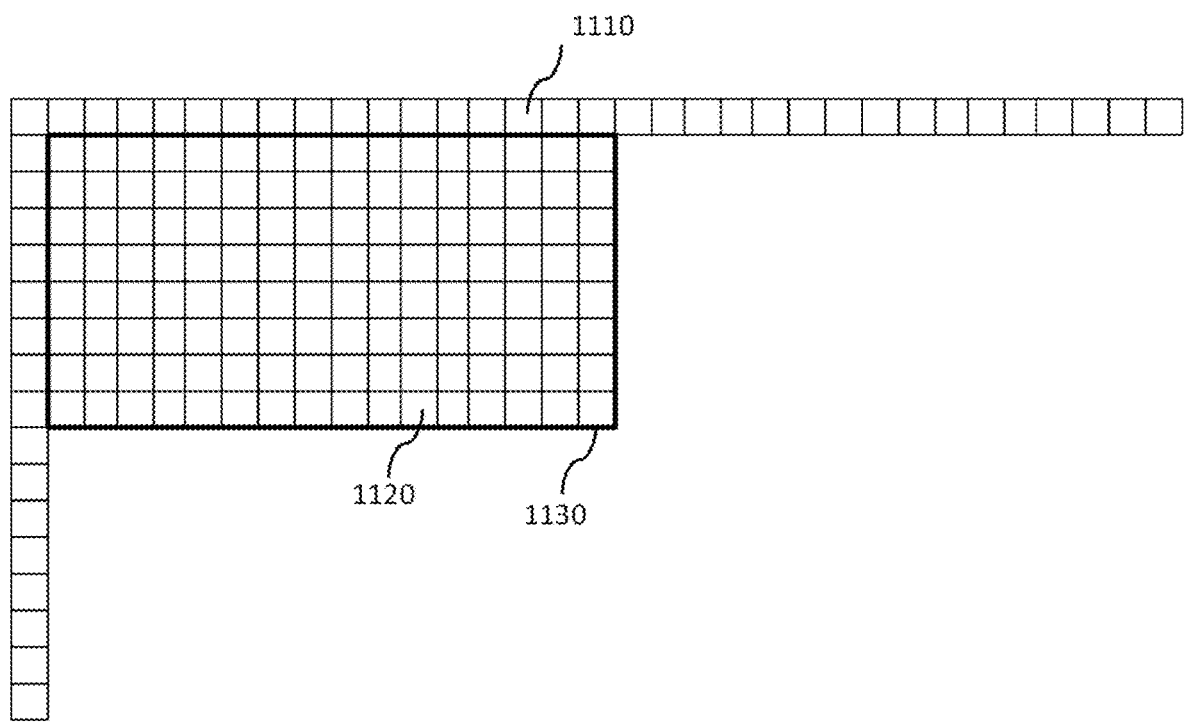
FIG. 21 shows a block to be predicted using an intra-prediction mode.

FIG. 21 illustrates a current block 1130, illustrated with a surrounding bold frame and including samples 1120. Further, the figure illustrates reference samples 1110 of neighbouring blocks. For instance, the reference samples may be samples of an above block or of a left block.

According to an embodiment, the provided method includes the following operations:
1. each selected directional intra-prediction mode is classified into one of the following groups:
   A. vertical or horizontal modes,
   B. diagonal modes that represent angles which are multiple of 45 degree,
   C. remaining directional modes;
2. if the directional intra-prediction mode is classified as belonging to group A, then then no filters are applied to reference samples 1110 to generate samples 1120 belonging to an intra predictor. Reference samples 1110 are separated from samples 1120 within a block to be predicted (intra-predictor) with block boundaries 1130 as shown in FIG. 11;
3. if a mode falls into group B, then a reference sample filter (any of the reference sample filter shown in Table 5, for example, [1, 2, 1]) is applied to reference samples to further copy these filtered values into an intra predictor according to the selected direction but no interpolation filters are applied;
4. if a mode is classified as belonging to group C, then only an intra reference sample interpolation filter (e.g., filters presented in Table 3) is applied to reference samples to generate a predicted sample that falls into a fractional or integer position between reference samples according to a selected direction (no reference sample filtering is performed).

According to an embodiment, the provided method provides the following operations:
1. The directional intra-prediction mode for intra-prediction processing of a current block is classified into one of the following groups:
   A. Vertical or horizontal modes,
   B. Directional modes including diagonal modes that represent angles which are multiples of 45 degrees,
   C. Remaining directional modes.
2. If the directional intra-prediction mode is classified as belonging to group B, a reference sample filter is applied to the reference samples;
3. If the directional intra-prediction mode is classified as belonging to group C, an intra reference sample interpolation filter is applied to the reference samples.

In other words, depending on the classification of the intra-prediction mode to be used for intra-prediction of a current block, either a reference sample is applied (classification B) or a reference sample interpolation filter is applied (classification C).

In particular, according to the embodiment, either a sample filter or a sample interpolation filter is applied. In particular, no interpolation filter is applied in a case where the reference sample filter according to a directional intra prediction mode is not a fractional sample. In other words, in a case where the reference sample according to the prediction direction falls onto an integer sample, no interpolation filter has to be used.

Further, according to the classification, no filter at all may be used. For example, in a case of classification A of the intra-prediction mode to be used for intra-prediction of the current block, neither a reference sample filter nor a reference sample interpolation filter may be used.

Predicted samples may be obtained from the left and top lines of reference samples, as illustrated in FIG. 21. Depending on the intra prediction mode, for each of the predicted sample, a corresponding position of reference sample is determined. If the mode has a non-integer slope, position of the reference sample is fractional and the reference sample value is obtained by applying an interpolation filter to the subset of reference samples that is adjacent to this fractional position.

Position of this reference sample within a line of reference samples has a horizontal (when the intra prediction mode is greater than DIA_IDX) or vertical (when the intra prediction mode is smaller than DIA-IDX) offset with respect to the predicted sample position. The value of this offset depends on the angle of the mode and the distance from the predicted sample to the line of reference samples. When the intra prediction mode is either 2 or VDIA_IDX, the angle of prediction is equal to 45 degrees, and the value of the offset is equal to the value of the distance to the line of reference samples.

Diagonal modes of group B may also comprise integer-slope wide-angle modes. In this case, similarly to modes DIA_IDX and VDIA_IDX, the value of the offset is a multiple of the distance to the line of reference samples, and reference sample positions for each predicted sample is non-fractional.

For example, when multi-reference line prediction is not used (reference line index is equal to zero) and the position of a predicted sample within a block is equal to (1,3) relative to the top-left predicted sample that has position (0, 0), the distance to the lines of reference sample is equal to 4 samples when intra prediction mode is greater than DIA_IDX. When the intra prediction mode is smaller than DIA_IDX, this distance is equal to 2.

When the intra prediction mode is a wide-angular mode and its slope is an integer, the value of the predicted sample can be calculated as:

$$predSamples[x,y]=p[x+\Delta][-1],$$

$$\Delta=N^*(y+1)$$

when the intra prediction mode is greater than DIA_IDX, otherwise, $$predSamples[x,y]=p[-1][y+\Delta],$$

$$\Delta=N^*(x+1).$$

Here, $\Delta$ denotes the value of the offset.

The value N for 45-angle modes 2 and VDIA_IDX is equal to 1.

The modes that represent angles which are a multiple of 45 degrees would use the same expressions to determine predicted samples "predSamples[x][y]", but the value of N would be greater than 1 and integer. Note that modes that represent angles which are multiple of 45 degrees do not necessarily include the horizontal and the vertical modes.

It could be noticed that the value of offset $\Delta$ for wide-angle integer-slope modes is a multiple of offset for mode 2 and mode VDIA_IDX, Generally, the value of the offset can be mapped to the intra prediction mode (predModeIntra) using a parameter "intraPredAngle". A specific mapping of this parameter to the intra prediction mode is shown in table 6 below:

TABLE 6

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

$$invAngle = \text{Round}\left(\frac{256 * 32}{intraPredAngle}\right)$$

An exemplary derivation of predicted samples is described below:
The values of the prediction samples predSamples[x][y], with x=0 ... nTbW−1, y=0 ... nTbH−1 are derived as follows:
If predModeIntra is greater than or equal to 34, the following ordered operations apply:
1. The reference sample array ref[x] is specified as follows:
The following applies:

ref[x]=p[−1−refIdx+x][−1−refIdx], with x=0 ... nTbW+refIdx

If intraPredAngle is less than 0, the main reference sample array is extended as follows:
When (nTbH*intraPredAngle)>>5 is less than 1, ref[x]=p[−1−refIdx][−1−refIdx+((x*invAngle+128)>>8)], with x=−1 ... (nTbH*intraPredAngle)>>5 ref[((nTbH*intraPredAngle)>>5)−1]=ref[(nTbH*intraPredAngle)>>5]

ref[nTbW+1+refIdx]=ref[nTbW+refIdx]

Otherwise, ref[x]=p[−1−refIdx+x][−1−refIdx], with x=nTbW+1+refIdx ... refW+refIdx ref[−1]=ref[0]

The additional samples ref[refW+refIdx+x] with x=1 ... (Max(1, nTbW/nTbH)*refIdx+1) are derived as follows:

ref[refW+refIdx+x]=p[−1+refW][−1−refIdx]

2. The values of the prediction samples predSamples[x][y], with x=0 ... nTbW−1, y=0 ... nTbH−1 are derived as follows:
The index variable iIdx and the multiplication factor iFact are derived as follows:

iIdx=((y+1+refIdx)*intraPredAngle)>>5+refIdx iFact=((y+1+refIdx)*intraPredAngle)& 31

If cIdx is equal to 0, the following applies:
The interpolation filter coefficients fT[j] with j=0 ... 3 are derived as follows:

fT[j]=filterFlag?fG[iFact][j]:fC[iFact][j]

The value of the prediction samples predSamples[x][y] is derived as follows:

predSamples[x][y]=Clip1Y(((Σ$_{i=0}^{3}$fT[i]*ref[x+iIdx+i])+32)>>6)

Otherwise (cIdx is not equal to 0), depending on the value of iFact, the following applies:
If iFact is not equal to 0, the value of the prediction samples predSamples[x][y] is derived as follows:

predSamples[x][y]=((32−iFact)*ref[x+iIdx+1]+iFact*ref[x+iIdx+2]+16)>>5

Otherwise, the value of the prediction samples predSamples[x][y] is derived as follows:

predSamples[x][y]=ref[x+iIdx+1]

Otherwise (predModeIntra is less than 34), the following ordered operations apply:
3. The reference sample array ref[x] is specified as follows:
The following applies:

ref[x]=p[−1−refIdx][−1−refIdx+x], with x=0 ... nTbH+refIdx

If intraPredAngle is less than 0, the main reference sample array is extended as follows:
  When (nTbW*intraPredAngle)>>5 is less than −1, ref[x]=p[−1−refIdx+((x*invAngle+128)>>8)][−1−refIdx], with x=1 . . . (nTbW*intraPredAngle)>>5 ref[((nTbW*intraPredAngle)>>5)−1]=ref[(nTbW*intraPredAngle)>>5]

ref[nTbG+1+refIdx]=ref[nTbH+refIdx]

Otherwise, ref[x]=p[−1−refIdx][−1−refIdx+x], with x=nTbH+1+refIdx . . . refH+refIdx ref[1]=ref[0]

The additional samples ref[refH+refIdx+x] with x=1 . . . (Max(1, nTbW/nTbH)*refIdx+1) are derived as follows:

ref[refH+refIdx+x]=p[−1+refH][−1−refIdx]

4. The values of the prediction samples predSamples[x][y], with x=0 . . . nTbW−1, y=0 . . . nTbH−1 are derived as follows:
  The index variable iIdx and the multiplication factor iFact are derived as follows:

iIdx=((x+1+refIdx)*intraPredAngle)>>5 iFact=((x+1+refIdx)*intraPredAngle)& 31

If cIdx is equal to 0, the following applies:
    The interpolation filter coefficients fT[j] with j=0 . . . 3 are derived as follows:

fT[j]=filterFlag?fG[iFact][j]:fC[iFact][j]

The value of the prediction samples predSamples[x][y] is derived as follows:

predSamples[x][y]=Clip1Y(((Σ$_{i=0}^{3}$T[i]*ref[y+iIdx+i])+32)>>6)

Otherwise (cIdx is not equal to 0), depending on the value of iFact, the following applies:
    If iFact is not equal to 0, the value of the prediction samples predSamples[x][y] is derived as follows:

predSamples[x][y]=((32−iFact)*ref[y+iIdx+1]+iFact*ref[y+iIdx+2]+16)>>5

Otherwise, the value of the prediction samples predSamples[x][y] is derived as follows:

predSamples[x][y]=ref[y+iIdx+1]

From the example above and the table above it can be noticed that invocation of interpolation for some of the modes is redundant. Specifically, this occurs for the modes that have a corresponding intraPredAngle parameter being a multiple of 32. The value 32 corresponds to a mode with integer 45-degree slope. In fact, the value of predAngle is a 5-bit fixed-point integer representation for the value of offset that would be used for predicted samples adjacent to the line of reference samples.

Specifically, for the modes [−14, −12, −10, −6, 2, 34, 66, 72, 76, 78, 80], calculation of predicted samples do not require interpolation. The values of predicted samples can be obtained by copying reference samples.

A version of a VVC draft specification that incorporates an exemplary implementation of an embodiment of the disclosure is given in the text below:
8.4.4.2.1 General Intra Sample Prediction
Inputs to this process are:
  a sample location (xTbCmp, yTbCmp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable nCbW specifying the coding block width,
  a variable nCbH specifying the coding block height,
  a variable cIdx specifying the colour component of the current block.
Outputs of this process are the predicted samples predSamples[x][y], with x=0 . . . nTbW−1, y=0 . . . nTbH−1.
The variables refW and refH are derived as follows:
  If IntraSubPartitionsSplitType is equal to ISP_NO_SPLIT or cIdx is not equal to 0, the following applies:

refW=nTbW*2     (8-103)

refH=nTbH*2     (8-104)

Otherwise (IntraSubPartitionsSplitType is not equal to ISP_NO_SPLIT and cIdx is equal to 0), the following applies:

refW=nCbW*2     (8-105)

refH=nCbH*2     (8-106)

The variable refIdx specifying the intra prediction reference line index is derived as follows:

refIdx=(cIdx==0)?IntraLumaRefLineIdx[xTbCmp][yTbCmp]:0     (8-107)

For the generation of the reference samples p[x][y] with x=−1−refIdx, y=−1−refIdx . . . refH−1 and x=−refIdx . . . refW−1, y=−1−refIdx, the following ordered operations apply:
  1. The reference sample availability marking process as specified in clause 8.4.4.2.2 of Bross B et al.: "Versatile Cideo Coding (Draft 4)", JVET-M1001-v7, March 2019, (in the following, this document is referred to as JVET-M1001-v7) is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
  2. When at least one sample refUnfilt[x][y] with x=−1−refIdx, y=−1−refIdx . . . refH−1 and x=−refIdx . . . refW−1, y=−1−refIdx is marked as "not available for intra prediction", a reference sample substitution process as specified in clause 8.4.4.2.3 of JVET-M1001-v7 is invoked with the intra prediction reference line index refIdx, the reference sample width refW, the reference sample height refH, the reference samples refUnfilt[x][y] with x=−1 refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
  3. If predModeIntra is equal to INTRA_DC, RefFilterFlag is set equal to 0. Otherwise, parameter intraPredAngle, RefFilterFlag and InterpolationFlag are obtained by invoking the corresponding intraPredAngle parameter and filter flags derivation process specified in clause 8.4.4.2.7 below, with the intra prediction mode predModeIntra, the intra prediction reference line index refIdx, the transform block width nTbW, the transform block height nTbH, the coding block width nCbW and height nCbH, and the color component index cIdx.

4. The reference sample filtering process as specified in clause 8.4.4.2.4 below is invoked with the intra prediction reference line index refIdx, the transform block width nTbW and height nTbH, the reference sample width refW, the reference sample height refH, the unfiltered samples refUnfilt[x][y] with x=−1 refIdx, y=−1−refIdx . . . refH−1 and x=−refIdx . . . refW−1, y=−1−refIdx, RefFilterFlag parameter and the colour component index cIdx as inputs, and the reference samples p[x][y] with x=−1 refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process specified in clause 8.4.4.2.5 of JVET-M1001-v7 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.4.2.6 of JVET-M1001-v7 is invoked with the transform block width nTbW, the transform block height nTbH, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location (xTbC, yTbC) set equal to (xTbCmp, yTbCmp), the transform block width nTbW and height nTbH, and the reference sample array p as inputs, and the output is the predicted sample array predSamples.

Otherwise, the corresponding intra prediction mode process specified in clause 8.4.4.2.8 below is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the interpolation filter selection flag InterpolationFlag, the reference filter flag RefFilterFlag and the reference sample array p as inputs, and the modified intra prediction mode predModeIntra and the predicted sample array predSamples as outputs.

When all of the following conditions are true, the position-dependent prediction sample filtering process specified in clause 8.4.4.2.9 of JVET-M1001-v7 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=1, y=−1 . . . refH−1 and x=0 . . . refW−1, y=−1, and the colour component index cIdx as inputs, and the output is the modified predicted sample array predSamples:

IntraSubPartitionsSplitType is equal to ISP NO SPLIT or cIdx is not equal to 0 refIdx is equal to 0 or cIdx is not equal to 0

One of the following conditions is true:
predModeIntra is equal to INTRA_PLANAR
predModeIntra is equal to INTRA_DC
predModeIntra is equal to INTRA_ANGULAR18
predModeIntra is equal to INTRA_ANGULAR50
predModeIntra is less than or equal to INTRA_ANGULAR10
predModeIntra is greater than or equal to INTRA_ANGULAR58

8.4.4.2.4 Reference Sample Filtering Process

Inputs to this process are:
a variable refIdx specifying the intra prediction reference line index,
a variable nTbW specifying the transform block width,
a variable nTbH specifying the transform block height,
a variable refW specifying the reference samples width,
a variable refH specifying the reference samples height,
the (unfiltered) neighbouring samples refUnfilt[x][y], with x=−1−refIdx, y=−1−refIdx . . . refH−1 and x=−refIdx . . . refW−1, y=−1−refIdx,
RefFilterFlag parameter Outputs of this process are the reference samples p[x][y], with x=−1−refIdx, y=−1−refIdx . . . refH−1 and x=−refIdx . . . refW−1, y=−1−refIdx.

For the derivation of the reference samples p[x][y] the following applies:

If RefFilterFlag is equal to 1, the filtered sample values p[x][y] with x=−1, y=−1 and x=0 . . . refW−1, y=−1 are derived as follows:

$$p[-1][-1]=(refUnfilt[-1][0]+2*refUnfilt[-1][-1]+refUnfilt[0][-1]+2)>>2 \qquad (8\text{-}111)$$

$$p[-1][y]=(refUnfilt[-1][y+1]+2*refUnfilt[-1][y]+refUnfilt[-1][y1]+2)>>2 \text{ for } y=0 \ldots refH-2 \qquad (8\text{-}112)$$

$$p[-1][refH-1]=refUnfilt[-1][refH-1] \qquad (8\text{-}113)$$

$$p[x][-1]=(refUnfilt[x-1][-1]+2*refUnfilt[x][-1]+refUnfilt[x+1][-1]+2)>>2 \text{ for } x=0 \ldots refW-2 \qquad (8\text{-}114)$$

$$p[refW-1][-1]=refUnfilt[refW-1][-1] \qquad (8\text{-}115)$$

Otherwise, the reference samples values p[x][y] are set equal to the unfiltered sample values refUnfilt[x][y] with x=−1−refIdx, y=−1−refIdx . . . refH−1 and x=−refIdx . . . refW−1, y=−1−refIdx.

8.4.4.2.7 Specification of intraPredAngle Parameter and Filter Flags Derivation

Inputs to this process are:
the intra prediction mode predModeIntra,
a variable nTbW specifying the transform block width,
a variable nTbH specifying the transform block height,
a variable nCbW specifying the coding block width,
a variable nCbH specifying the coding block height,
a color component index cIdx Outputs of this process are the modified intra prediction mode predModeIntra, intraPredAngle parameter RefFilterFlag and InterpolationFlag variables.

The variables nW and nH are derived as follows:
If IntraSubPartitionsSplitType is equal to ISP_NO_SPLIT or cIdx is not equal to 0, the following applies:

$nW=nTbW$ $nH=nTbH$

Otherwise (IntraSubPartitionsSplitType is not equal to ISP_NO_SPLIT and cIdx is equal to 0), the following applies:

$nW=nCbW$ $nH=nCbH$

The variable whRatio is set equal to Abs(Log 2(nW/nH)).
For non-square blocks (nW is not equal to nH), the intra prediction mode predModeIntra is modified as follows:
If all of the following conditions are true, predModeIntra is set equal to (predModeIntra+65).
  nW is greater than nH
  predModeIntra is greater than or equal to 2
  predModeIntra is less than (whRatio>1)?(8+2*whRatio): 8
Otherwise, if all of the following conditions are true, predModeIntra is set equal to (predModeIntra−67).
  nH is greater than nW
  predModeIntra is less than or equal to 66
  predModeIntra is greater than (whRatio>1)?(60−2*whRatio): 60

The angle parameter intraPredAngle is determined as specified in Table 7 using predModeIntra value.

TABLE 7

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The variable filterFlag is derived as follows:
If one or more of the following conditions is true, filterFlag is set equal to 0.
  cIdx is not equal to 0
  refIdx is not equal to 0
  IntraSubPartitionsSplitType is not equal to ISP_NO_SPLIT and cIdx is equal to 0 and predModeIntra is greater than or equal to INTRA_ANGULAR34 and nW is greater than 8
  IntraSubPartitionsSplitType is not equal to ISP_NO_SPLIT and cIdx is equal to 0 and predModeIntra is less than INTRA_ANGULAR34 and nH is greater than 8.

Otherwise, if predModeIntra is INTRA_PLANAR, the variable filterFlag is set equal to nTbS>5?1:0
Otherwise, if intraPredAngle is greater than 32, variable filterFlag is set equal to 1
Otherwise, the following applies:
  The variable minDistVerHor is set equal to Min(Abs(predModeIntra−50), Abs(predModeIntra−18)).
  The variable intraHorVerDistThres[nTbS] is specified in Table 8.
  The variable filterFlag is derived as follows:
    If minDistVerHor is greater than intraHorVerDistThres[nTbS] or Abs (intraPredAngle)>32, filterFlag is set equal to 1.

TABLE 8

Specification of intraHorVerDistThres[ nTbS ] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 16 | 14 | 2 | 0 | 0 | 0 |

The output variables RefFilterFlag and InterpolationFlag are derived as follows:
  If predModeIntra is INTRA_PLANAR or predIntraAng is an integer multiple of 32, the variable RefFilterFlag is set equal to filterFlag, InterpolationFlag is set equal to 0,
  Otherwise, the variable RefFilterFlag is set equal to 0, InterpolationFlag is set equal to filterFlag.
  Informative: RefFilterFlag and InterpolationFlag shall never be both equal to 1 for any predModeIntra, see Table 9):

TABLE 9

Specification of RefFilterFlag and InterpolationFlag (informative)

| predModeIntra | RefFilterFlag | InterpolationFlag |
|---|---|---|
| INTRA_DC, 18, 50 | 0 | 0 |
| INTRA_PLANAR | filterFlag | 0 |
| −14, −12, −10, −6, 2, 34, 66, 72, 76, 78, 80 | filterFlag | 0 |
| Other modes | 0 | filterFlag |

8.4.4.2.8 Specification of Angular Intra Prediction Modes
Inputs to this process are:
Intra prediction mode predModeIntra,
the intraPredAngle parameter,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width,
a variable nCbH specifying the coding block height,
a variable InterpolationFlag specifying the usage of 4-tap filter interpolation,
a variable RefFilterFlag specifying whether neighbouring samples are filtered
the neighbouring samples p[x][y], with x=−1 refIdx, y=−1−refIdx . . . refH−1 and x=−refIdx . . . refW−1, y=−1−refIdx.

Outputs of this process are the modified intra prediction mode predModeIntra and the predicted samples predSamples[x][y], with x=0 . . . nTbW−1, y=0 . . . nTbH−1.

The variable nTbS is set equal to (Log 2 (nTbW)+Log 2 (nTbH))>>1

Figure 18:
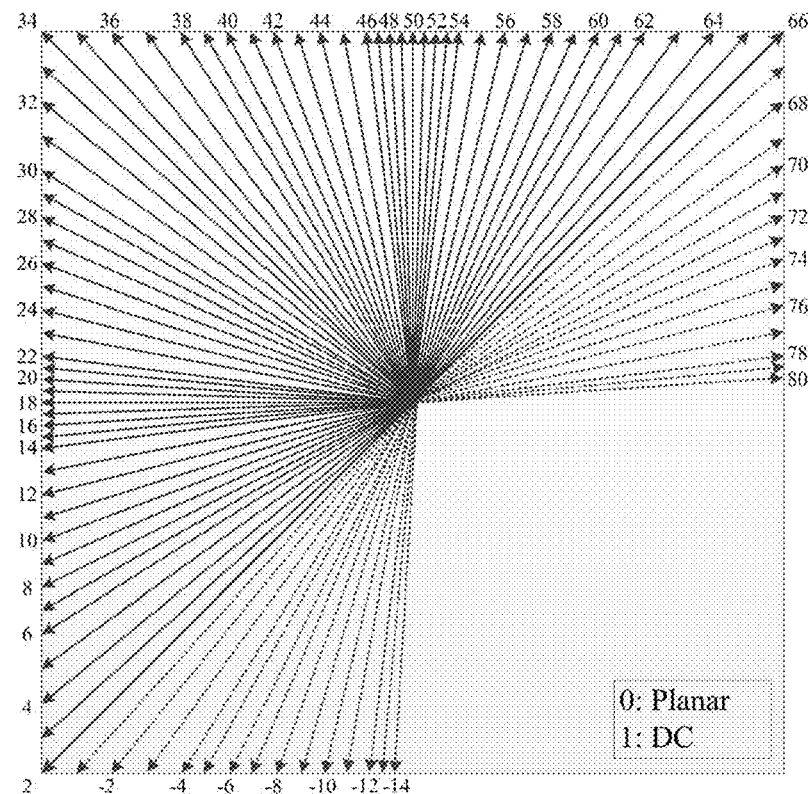
FIG. 18 shows a schematic diagram illustrating 93 intra prediction directions.

FIG. 18 illustrates the 93 prediction directions, where the dashed directions are associated with the wide-angle modes that are only applied to non-square blocks.

The inverse angle parameter invAngle is derived based on intraPredAngle as follows:

$$invAngle = \text{Round}\left(\frac{256*32}{intraPredAngle}\right)$$

The interpolation filter coefficients fC[phase][j] and fG[phase][j] with phase=0 . . . 31 and j=0 . . . 3 are specified in Table 10.

TABLE 10

Specification of interpolation filter coefficients fC and fG

| Fractional sample position p | fC interpolation filter coefficients | | | | fG interpoolation filter coefficients | | | |
|---|---|---|---|---|---|---|---|---|
| | $f_C[p][0]$ | $f_C[p][1]$ | $f_C[p][2]$ | $f_C[p][3]$ | fG[ p ][ 0 ] | fG[ p ][ 1 ] | fG[ p ][ 2 ] | fG[ p ][ 3 ] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |

TABLE 10-continued

Specification of interpolation filter coefficients fC and fG

| Fractional sample position p | fC interpolation filter coefficients | | | | fG interpoolation filter coefficients | | | |
|---|---|---|---|---|---|---|---|---|
| | $f_C[p][0]$ | $f_C[p][1]$ | $f_C[p][2]$ | $f_C[p][3]$ | fG[ p ][ 0 ] | fG[ p ][ 1 ] | fG[ p ][ 2 ] | fG[ p ][ 3 ] |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

The values of the prediction samples predSamples[x][y], with x=0 . . . nTbW−1, y=0 . . . nTbH−1 are derived as follows:

If predModeIntra is greater than or equal to 34, the following ordered operations apply:
1. The reference sample array ref[x] is specified as follows:
The following applies:

ref[x]=p[−1−refIdx+x][−1−refIdx], with x=0 . . . nTbW+refIdx

If intraPredAngle is less than 0, the main reference sample array is extended as follows:
When (nTbH*intraPredAngle)>>5 is less than −1, ref[x]=p[−1−refIdx][−1−refIdx+((x*invAngle+128)>>8)], with x=−1 . . . (nTbH*intraPredAngle)>>5 ref[((nTbH*intraPredAngle)>>5)−1]=ref[(nTbH*intraPredAngle)>>5]

ref[nTbW+1+refIdx]=ref[nTbW+refIdx]

Otherwise, ref[x]=p[−1−refIdx+x][−1−refIdx], with x=nTbW+1+refIdx . . . refW+refIdx ref[1]=ref[0]

The additional samples ref[refW+refIdx+x] with x=1 . . . (Max(1, nTbW/nTbH)*refIdx+1) are derived as follows:

ref[refW+refIdx+x]=p[−1+refW][−1−refIdx]

2. The values of the prediction samples predSamples[x][y], with x=0 . . . nTbW−1, y=0 . . . nTbH−1 are derived as follows:
The index variable iIdx and the multiplication factor iFact are derived as follows:

iIdx=((y+1+refIdx)*intraPredAngle)>>5+refIdx iFact=((y+1+refIdx)*intraPredAngle)& 31

If RefFilterFlag is equal to 0, the following applies:
The interpolation filter coefficients fT[j] with j=0 . . . 3 are derived as follows:

fT[j]=InterpolationFlag?fG[iFact][j]:fC[iFact][j]

The value of the prediction samples predSamples[x][y] is derived as follows:

predSamples[x][y]=Clip1Y(((Σ$_{i=0}^{3}$fT[i]*ref[x+iIdx+i])+32)>>6)

Otherwise (RefFilterFlag is not equal to 0), depending on the value of iFact, the following applies:
If iFact is not equal to 0, the value of the prediction samples predSamples[x][y] is derived as follows:

predSamples[x][y]=((32−iFact)*ref[x+iIdx+1]+iFact*ref[x+iIdx+2]+16)>>5

Otherwise, the value of the prediction samples predSamples[x][y] is derived as follows:

predSamples[x][y]=ref[x+iIdx+1]

Otherwise (predModeIntra is less than 34), the following ordered operations apply:
1. The reference sample array ref[x] is specified as follows:
The following applies:

ref[x]=p[−1−refIdx][−1−refIdx+x], with x=0 . . . nTbH+refIdx

If intraPredAngle is less than 0, the main reference sample array is extended as follows:
When (nTbW*intraPredAngle)>>5 is less than −1, ref[x]=p[−1−refIdx+((x*invAngle+128)>>8)][−1−refIdx], with x=−1 . . . (nTbW*intraPredAngle)>>5 ref[((nTbW*intraPredAngle)>>5)−1]=ref[(nTbW*intraPredAngle)>>5]

ref[nTbG+1+refIdx]=ref[nTbH+refIdx]

Otherwise, ref[x]=p[−1−refIdx][−1−refIdx+x], with x=nTbH+1+refIdx . . . refH+refIdx ref[1]=ref[0]

The additional samples ref[refH+refIdx+x] with x=1 . . . (Max(1, nTbW/nTbH)*refIdx+1) are derived as follows:

ref[refH+refIdx+x]=p[−1+refH][−1−refIdx]

2. The values of the prediction samples predSamples[x][y], with x=0 . . . nTbW−1, y=0 . . . nTbH−1 are derived as follows:
The index variable iIdx and the multiplication factor iFact are derived as follows:

iIdx=((x+1+refIdx)*intraPredAngle)>>5 iFact=((x+1+refIdx)*intraPredAngle)&31

If RefFilterFlag is equal to 0, the following applies:
 The interpolation filter coefficients fT[j] with j=0 . . . 3 are derived as follows:

$fT[j]$=InterpolationFlag?$fG[iFact][j]$:$fC[iFact][j]$

The value of the prediction samples predSamples[x][y] is derived as follows:

predSamples[x][y]=Clip1Y((($\Sigma_{i=0}^{3}fT[i]$*ref[y+iIdx+i])+32)>>6)

Otherwise (RefFilterFlag is not equal to 0), depending on the value of iFact, the following applies:
 If iFact is not equal to 0, the value of the prediction samples predSamples[x][y] is derived as follows:

predSamples[x][y]=((32−iFact)*ref[y+iIdx+1]+iFact*ref[y+iIdx+2]+16)>>5

Otherwise, the value of the prediction samples predSamples[x][y] is derived as follows:

predSamples[x][y]=ref[y+iIdx+1]

Based on the size of the predicted block, wide-angle modes may fall into different groups. In the example given below, these modes would still belong to either group "B" or group "C" depending on whether they have a non-fractional slope. However, selection of the interpolation filter for the modes of group "C" and the presence of reference sample filtering operation for modes of group "B" would depend on the size of the block. The part of filterFlag derivation may be modified as follows:
 The variable filterFlag is derived as follows:
 If one or more of the following conditions is true, filterFlag is set equal to 0.
  cIdx is not equal to 0
  refIdx is not equal to 0
  IntraSubPartitionsSplitType is not equal to ISP_NO_SPLIT and cIdx is equal to 0 and predModeIntra is greater than or equal to INTRA_ANGULAR34 and nW is greater than 8
  IntraSubPartitionsSplitType is not equal to ISP_NO_SPLIT and cIdx is equal to 0 and predModeIntra is less than INTRA_ANGULAR34 and nH is greater than 8.
 Otherwise, if predModeIntra is INTRA_PLANAR the variable filterFlag is set equal to nTbS>5?1:0
 Otherwise, if intraPredAngle is greater than 32 and nTbW*nTbH is greater than 32, variable filterFlag is set equal to 1
 Otherwise, the following applies:
  The variable minDistVerHor is set to Min(Abs(predModeIntra−50), Abs(predModeIntra−18)).
  The variable intraHorVerDistThres[nTbS] is specified in Table 11.
  The variable filterFlag is derived as follows:
   If minDistVerHor is greater than intraHorVerDistThres[nTbS] or Abs (intraPredAngle)>32, filterFlag is set equal to 1.

illustrated in FIG. 18, wide-angle modes are modes −14 to −1 as well as modes 67 to 80.

Another version of a VVC draft specification that incorporates an exemplary implementation of an embodiment of the present disclosure comprises the following part that relates to reference sample filtering is given below:

For the generation of the reference samples p[x][y] with x=1−refIdx, y=−1−refIdx . . . refH−1 and x=−refIdx . . . refW−1, y=−1−refIdx, the following ordered operations apply:
1. The reference sample availability marking process as specified in clause 8.4.4.2.2 of JVET-M1001-v7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=1−refIdx, y=−1−refIdx . . . refH−1 and x=−refIdx . . . refW−1, y=−1−refIdx as output.
2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.4.2.3 of JVET-M1001-v7 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as outputIf predModeIntra is not equal to INTRA_PLANAR and predModeIntra is not equal to INTRA_DC, parameter intraPredAngle is obtained by invoking the corresponding intra prediction mode process specified in clause 8.4.4.2.7 below, otherwise, if predModeIntra is equal to INTRA_PLANAR, intraPredAngle is set to 32 otherwise intraPredAngle is set to 0.
3. The reference sample filtering process as specified in clause 8.4.4.2.4 below is invoked with the intra prediction reference line index refIdx, the transform block width nTbW and height nTbH, the reference sample width refW, the reference sample height refH, the unfiltered samples refUnfilt[x][y] with x=−1−refIdx, y=−1−refIdx . . . refH−1 and x=−refIdx . . . refW−1, y=−1−refIdx, intraPredAngle parameter and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

TABLE 11

Specification of intraHorVerDistThres[ nTbS ] for various transform block sizes nTbS

|  | nTbS = 2 | nTbS = 3 | nTbS = 4 | nTbS = 5 | nTbS = 6 | nTbS = 7 |
| --- | --- | --- | --- | --- | --- | --- |
| intraHorVerDistThres[ nTbS ] | 16 | 14 | 2 | 0 | 0 | 0 |

Wide-angle modes may be modes indicating directions within the lower part of the lower left quadrant or the right part or the above right quadrant. Specifically, in the example If predModeIntra is equal to INTRA_PLANAR, the corresponding intra prediction mode process specified in clause 8.4.4.2.5 of JVET-M1001-v7 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.4.2.6 of JVET-M1001-v7 is invoked with the transform block width nTbW, the transform block height nTbH, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.4.2.8 below is invoked with the intra prediction mode predModeIntra, the sample location (xTbC, yTbC) set equal to (xTbCmp, yTbCmp), the transform block width nTbW and height nTbH, and the reference sample array p as inputs, and the output is the predicted sample array predSamples.

Otherwise, If one or more of the following conditions is true, fourTapFlag is set equal to 0:
the colour component index cIdx is not equal to 0
intraPredAngle is a multiple of 32.

Otherwise, the corresponding intra prediction mode process specified in clause 8.4.4.2.7 below is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the fourTapFlag, and the reference sample array p as inputs, and the modified intra prediction mode predModeIntra and the predicted sample array predSamples as outputs.

8.4.4.2.4 Reference Sample Filtering Process
Inputs to this process are:
a variable refIdx specifying the intra prediction reference line index,
a variable nTbW specifying the transform block width,
a variable nTbH specifying the transform block height,
a variable refW specifying the reference samples width,
a variable refH specifying the reference samples height,
the (unfiltered) neighbouring samples refUnfilt[x][y], with x=−1−refIdx, y=−1−refIdx . . . refH−1 and x=−refIdx . . . refW−1, y=−1−refIdx,
predIntraAngle parameter
a variable cIdx specifying the colour component of the current block.

Outputs of this process are the reference samples p[x][y], with x=−1−refIdx, y=−1−refIdx . . . refH−1 and x=−refIdx . . . refW−1, y=−1−refIdx.

The variable filterFlag is derived as follows:
If all of the following conditions are true, filterFlag is set equal to 1:
refIdx is equal to 0
nTbW*nTbH is greater than 32
cIdx is equal to 0
IntraSubPartitionsSplitType is equal to ISP_NO_SPLIT
predIntraAngle is not equal to 0 and it is a multiple of 32
Otherwise, filterFlag is set equal to 0.

For the derivation of the reference samples p[x][y] the following applies:
If filterFlag is equal to 1, the filtered sample values p[x][y] with x=1, y=−1 and x=0 . . . refW−1, y=−1 are derived as follows:

$$p[1][-1]=(refUnfilt[-1][0]+2*refUnfilt[-1][-1]+refUnfilt[0][-1]+2)>>2 \quad (8\text{-}111)$$

$$p[-1][y]=(refUnfilt[-1][y+1]+2*refUnfilt[-1][y]+refUnfilt[-1][y-1]+2)>>2 \text{ for } y=0 \ldots refH-2 \quad (8\text{-}112)$$

$$p[-1][refH-1]=refUnfilt[-1][refH-1] \quad (8\text{-}113)$$

$$p[x][-1]=(refUnfilt[x-1][-1]+2*refUnfilt[x][-1]+refUnfilt[x+1][-1]+2)>>2 \text{ for } x=0 \ldots refW-2 \quad (8\text{-}114)$$

$$p[refW-1][-1]=refUnfilt[refW-1][-1] \quad (8\text{-}115)$$

Otherwise, the reference samples values p[x][y] are set equal to the unfiltered sample values refUnfilt[x][y] with x=−1−refIdx, y=−1−refIdx . . . refH−1 and x=−refIdx . . . refW−1, y=−1−refIdx.

8.4.4.2.7 Specification of intraPredAngle parameter
Inputs to this process are:
the intra prediction mode predModeIntra,
a variable nTbW specifying the transform block width,
a variable nTbH specifying the transform block height,
a variable nCbW specifying the coding block width,
a variable nCbH specifying the coding block height,
Outputs of this process are the modified intra prediction mode predModeIntra, intraPredAngle parameter and a filterFlag variable.

The variables nW and nH are derived as follows:
If IntraSubPartitionsSplitType is equal to ISP_NO_SPLIT or cIdx is not equal to 0, the following applies:

$$nW=nTbW \quad (8\text{-}125)$$

$$nH=nTbH \quad (8\text{-}126)$$

Otherwise (IntraSubPartitionsSplitType is not equal to ISP_NO_SPLIT and cIdx is equal to 0), the following applies:

$$nW=nCbW \quad (8\text{-}127)$$

$$nH=nCbH \quad (8\text{-}128)$$

The variable whRatio is set equal to Abs(Log 2(nW/nH)).
For non-square blocks (nW is not equal to nH), the intra prediction mode predModeIntra is modified as follows:
If all of the following conditions are true, predModeIntra is set equal to (predModeIntra+65).
nW is greater than nH
predModeIntra is greater than or equal to 2
predModeIntra is less than (whRatio>1)?(8+2*whRatio): 8
Otherwise, if all of the following conditions are true, predModeIntra is set equal to (predModeIntra−67).
nH is greater than nW
predModeIntra is less than or equal to 66
predModeIntra is greater than (whRatio>1)?(60−2*whRatio): 60
The angle parameter intraPredAngle is determined as specified in Table 12 using predModeIntra value.

TABLE 12

Specification of intraPredAngle

| predModeIntra | -14 | -13 | -12 | -11 | -10 | -9 | -8 | -7 | -6 | -5 | -4 | -3 | -2 | -1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | -1 | -2 | -3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | -4 | -6 | -8 | -10 | -12 | -14 | -16 | -18 | -20 | -23 | -26 | -29 | -32 | -29 | -26 | -23 | -20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | -18 | -16 | -14 | -12 | -10 | -8 | -6 | -4 | -3 | -2 | -1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The variable filterFlag is derived as follows:
If one or more of the following conditions is true, filterFlag is set equal to 0.
 refIdx is not equal to 0
 IntraSubPartitionsSplitType is not equal to ISP_NO_SPLIT and cIdx is equal to 0 and predModeIntra is greater than or equal to INTRA_ANGULAR34 and nW is greater than 8
 IntraSubPartitionsSplitType is not equal to ISP_NO_SPLIT and cIdx is equal to 0 and predModeIntra is less than INTRA_ANGULAR34 and nH is greater than 8.
Otherwise, the following applies:
 The variable minDistVerHor is set equal to Min(Abs(predModeIntra−50), Abs(predModeIntra−18)).
 The variable intraHorVerDistThres[nTbS] is specified in Table 11.
 The variable filterFlag is derived as follows:
  If minDistVerHor is greater than intraHorVerDistThres[nTbS] or Abs (intraPredAngle)>32, filterFlag is set equal to 1.

8.4.4.2.8 Specification of angular intra prediction modes
Inputs to this process are:
Intra prediction mode predModeIntra,
the intraPredAngle parameter,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width,
a variable nCbH specifying the coding block height,
a variable fourTapFlag specifying the usage of 4-tap filter interpolation,
a variable filterFlag
the neighbouring samples p[x][y], with x=−1−refIdx, y=−1−refIdx . . . refH−1 and x=−refIdx . . . refW−1, y=−1−refIdx.
Outputs of this process are the modified intra prediction mode predModeIntra and the predicted samples predSamples[x][y], with x=0 . . . nTbW−1, y=0 . . . nTbH−1.
The variable nTbS is set equal to (Log 2 (nTbW)+Log 2 (nTbH))>>1.
The variable filterFlag is derived as follows:
If one or more of the following conditions is true, filterFlag is set equal to 0.
 refIdx is not equal to 0
 IntraSubPartitionsSplitType is not equal to ISP_NO_SPLIT and cIdx is equal to 0 and predModeIntra is greater than or equal to INTRA_ANGULAR34 and nW is greater than 8
 IntraSubPartitionsSplitType is not equal to ISP_NO_SPLIT and cIdx is equal to 0 and predModeIntra is less than INTRA_ANGULAR34 and nH is greater than 8.
Otherwise, the following applies:
 The variable minDistVerHor is set equal to Min(Abs(predModeIntra−50), Abs(predModeIntra−18)).
 The variable intraHorVerDistThres[nTbS] is specified in Table 13.
 The variable filterFlag is derived as follows:
  If minDistVerHor is greater than intraHorVerDistThres[nTbS] or Abs(intraPredAngle) is greater than 32, filterFlag is set equal to 1.
  Otherwise, filterFlag is set equal to 0.

TABLE 13

Specification of intraHorVerDistThres[ nTbS ] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 16 | 14 | 2 | 0 | 0 | 0 |

FIG. 18 illustrates the 93 prediction directions, where the dashed directions are associated with the wide-angle modes that are only applied to non-square blocks.

The inverse angle parameter invAngle is derived based on intraPredAngle as follows:

$$invAngle = \text{Round}\left(\frac{256*32}{intraPredAngle}\right) \quad (8\text{-}129)$$

The interpolation filter coefficients fC[phase][j] and fG[phase][j] with phase=0 ... 31 and j=0 ... 3 are specified in Table 14.

TABLE 14

Specification of interpolation filter coefficients fC and fG

| Fractional sample position p | fC interpolation filter coefficients | | | | fG interpolation filter coefficients | | | |
|---|---|---|---|---|---|---|---|---|
| | $f_C[\,p\,][\,0\,]$ | $f_C[\,p\,][\,1\,]$ | $f_C[\,p\,][\,2\,]$ | $f_C[\,p\,][\,3\,]$ | fG[ p ][ 0 ] | fG[ p ][ 1 ] | fG[ p ][ 2 ] | fG[ p ][ 3 ] |
| 0  | 0  | 64 | 0  | 0  | 16 | 32 | 16 | 0  |
| 1  | −1 | 63 | 2  | 0  | 15 | 29 | 17 | 3  |
| 2  | −2 | 62 | 4  | 0  | 15 | 29 | 17 | 3  |
| 3  | −2 | 60 | 7  | −1 | 14 | 29 | 18 | 3  |
| 4  | −2 | 58 | 10 | −2 | 13 | 29 | 18 | 4  |
| 5  | −3 | 57 | 12 | −2 | 13 | 28 | 19 | 4  |
| 6  | −4 | 56 | 14 | −2 | 13 | 28 | 19 | 4  |
| 7  | −4 | 55 | 15 | −2 | 12 | 28 | 20 | 4  |
| 8  | −4 | 54 | 16 | −2 | 11 | 28 | 20 | 5  |
| 9  | −5 | 53 | 18 | −2 | 11 | 27 | 21 | 5  |
| 10 | −6 | 52 | 20 | −2 | 10 | 27 | 22 | 5  |
| 11 | −6 | 49 | 24 | −3 | 9  | 27 | 22 | 6  |
| 12 | −6 | 46 | 28 | −4 | 9  | 26 | 23 | 6  |
| 13 | −5 | 44 | 29 | −4 | 9  | 26 | 23 | 6  |
| 14 | −4 | 42 | 30 | −4 | 8  | 25 | 24 | 7  |
| 15 | −4 | 39 | 33 | −4 | 8  | 25 | 24 | 7  |
| 16 | −4 | 36 | 36 | −4 | 8  | 24 | 24 | 8  |
| 17 | −4 | 33 | 39 | −4 | 7  | 24 | 25 | 8  |
| 18 | −4 | 30 | 42 | −4 | 7  | 24 | 25 | 8  |
| 19 | −4 | 29 | 44 | −5 | 6  | 23 | 26 | 9  |
| 20 | −4 | 28 | 46 | −6 | 6  | 23 | 26 | 9  |
| 21 | −3 | 24 | 49 | −6 | 6  | 22 | 27 | 9  |
| 22 | −2 | 20 | 52 | −6 | 5  | 22 | 27 | 10 |
| 23 | −2 | 18 | 53 | −5 | 5  | 21 | 27 | 11 |
| 24 | −2 | 16 | 54 | −4 | 5  | 20 | 28 | 11 |
| 25 | −2 | 15 | 55 | −4 | 4  | 20 | 28 | 12 |
| 26 | −2 | 14 | 56 | −4 | 4  | 19 | 28 | 13 |
| 27 | −2 | 12 | 57 | −3 | 4  | 19 | 28 | 13 |
| 28 | −2 | 10 | 58 | −2 | 4  | 18 | 29 | 13 |
| 29 | −1 | 7  | 60 | −2 | 3  | 18 | 29 | 14 |
| 30 | 0  | 4  | 62 | −2 | 3  | 17 | 29 | 15 |
| 31 | 0  | 2  | 63 | −1 | 3  | 17 | 29 | 15 |

The values of the prediction samples predSamples[x][y], with x=0 ... nTbW−1, y=0 ... nTbH−1 are derived as follows:

If predModeIntra is greater than or equal to 34, the following ordered operations apply:
1. The reference sample array ref[x] is specified as follows:
The following applies:

ref[x]=p[−1−refIdx+x][−1−refIdx], with x=0 ...
    nTbW+refIdx (8-130)

If intraPredAngle is less than 0, the main reference sample array is extended as follows:
When (nTbH*intraPredAngle)>>5 is less than 1, ref[x]=p[−1−refIdx][−1−refIdx+((x*invAngle+
    128)>>8)], with x=1 ...
    (nTbH*intraPredAngle)>>5 (8-131)

ref[((nTbH*intraPredAngle)>>5)−1]=ref
    [(nTbH*intraPredAngle)>>5] (8-132)

ref[nTbW+1+refIdx]=ref[nTbW+refIdx] (8-133)

Otherwise, ref[x]=p[−1−refIdx+x][−1−refIdx], with x=nTbW+1+
    refIdx ... refW+refIdx (8-134)

ref[1]=ref[0] (8-135)

The additional samples ref[refW+refIdx+x] with x=1 ... (Max(1, nTbW/nTbH)*refIdx+1) are derived as follows:

ref[refW+refIdx+x]=p[−1+refW][−1−refIdx] (8-136)

2. The values of the prediction samples predSamples[x][y], with x=0 ... nTbW−1, y=0 ... nTbH−1 are derived as follows:
The index variable iIdx and the multiplication factor iFact are derived as follows:

iIdx=((y+1+refIdx)*intraPredAngle)>>5+refIdx (8-137)

iFact=((y+1+refIdx)*intraPredAngle)&31 (8-138)

If fourTapFlag is equal to 1, the following applies:
The interpolation filter coefficients fT[j] with j=0 ... 3 are derived as follows:

fT[j]=filterFlag?fG[iFact][j]:fC[iFact][j] (8-139)

The value of the prediction samples predSamples[x][y] is derived as follows:

$$predSamples[x][y]=Clip1Y(((\Sigma_{i=0}^{3}fT[i]*ref[x+iIdx+i])+32)>>6) \quad (8\text{-}140)$$

Otherwise (fourTapFlag is not equal to 1), depending on the value of iFact, the following applies:
If iFact is not equal to 0, the value of the prediction samples predSamples[x][y] is derived as follows:

$$predSamples[x][y]=((32-iFact)*ref[x+iIdx+1]+iFact*ref[x+iIdx+2]+16)>>5 \quad (8\text{-}141)$$

Otherwise, the value of the prediction samples predSamples[x][y] is derived as follows:

$$predSamples[x][y]=ref[x+iIdx+1] \quad (8\text{-}142)$$

Otherwise (predModeIntra is less than 34), the following ordered operations apply:
1. The reference sample array ref[x] is specified as follows:
   The following applies:

$$ref[x]=p[-1-refIdx][-1-refIdx+x], \text{ with } x=0 \ldots nTbH+refIdx \quad (8\text{-}143)$$

If intraPredAngle is less than 0, the main reference sample array is extended as follows:
When (nTbW*intraPredAngle)>>5 is less than −1, $$ref[x]=p[-1-refIdx+((x*invAngle+128)>>8)][-1-refIdx], \text{ with } x=-1 \ldots (nTbW*intraPredAngle)>>5 \quad (8\text{-}144)$$

$$ref[((nTbW*intraPredAngle)>>5)-1]=ref[(nTbW*intraPredAngle)>>5] \quad (8\text{-}145)$$

$$ref[nTbG+1+refIdx]=ref[nTbH+refIdx] \quad (8\text{-}146)$$

Otherwise, $$ref[x]=p[-1-refIdx][-1-refIdx+x], \text{ with } x=nTbH+1+refIdx \ldots refH+refIdx \quad (8\text{-}147)$$

$$ref[-1]=ref[0] \quad (8\text{-}148)$$

The additional samples ref[refH+refIdx+x] with x=1 . . . (Max(1, nTbW/nTbH)*refIdx+1) are derived as follows:

$$ref[refH+refIdx+x]=p[-1+refH][-1-refIdx] \quad (8\text{-}149)$$

2. The values of the prediction samples predSamples[x][y], with x=0 . . . nTbW−1, y=0 . . . nTbH−1 are derived as follows:
The index variable iIdx and the multiplication factor iFact are derived as follows:

$$iIdx=((x+1+refIdx)*intraPredAngle)>>5 \quad (8\text{-}150)$$

$$iFact=((x+1+refIdx)*intraPredAngle)\&31 \quad (8\text{-}151)$$

If fourTapFlag is equal to 1, the following applies:
The interpolation filter coefficients fT[j] with j=0 . . . 3 are derived as follows:

$$fT[j]=filterFlag?fG[iFact][j]:fC[iFact][j] \quad (8\text{-}152)$$

The value of the prediction samples predSamples[x][y] is derived as follows:

$$predSamples[x][y]=Clip1Y(((\Sigma_{i=0}^{3}fT[i]*ref[y+iIdx+i])+32)>>6) \quad (8\text{-}153)$$

Otherwise (fourTapFlag is not equal to 1), depending on the value of iFact, the following applies:
If iFact is not equal to 0, the value of the prediction samples predSamples[x][y] is derived as follows:

$$predSamples[x][y]=((32-iFact)*ref[y+iIdx+1]+iFact*ref[y+iIdx+2]+16)>>5 \quad (8\text{-}154)$$

Otherwise, the value of the prediction samples predSamples[x][y] is derived as follows:

$$predSamples[x][y]=ref[y+iIdx+1].$$

Figure 19:
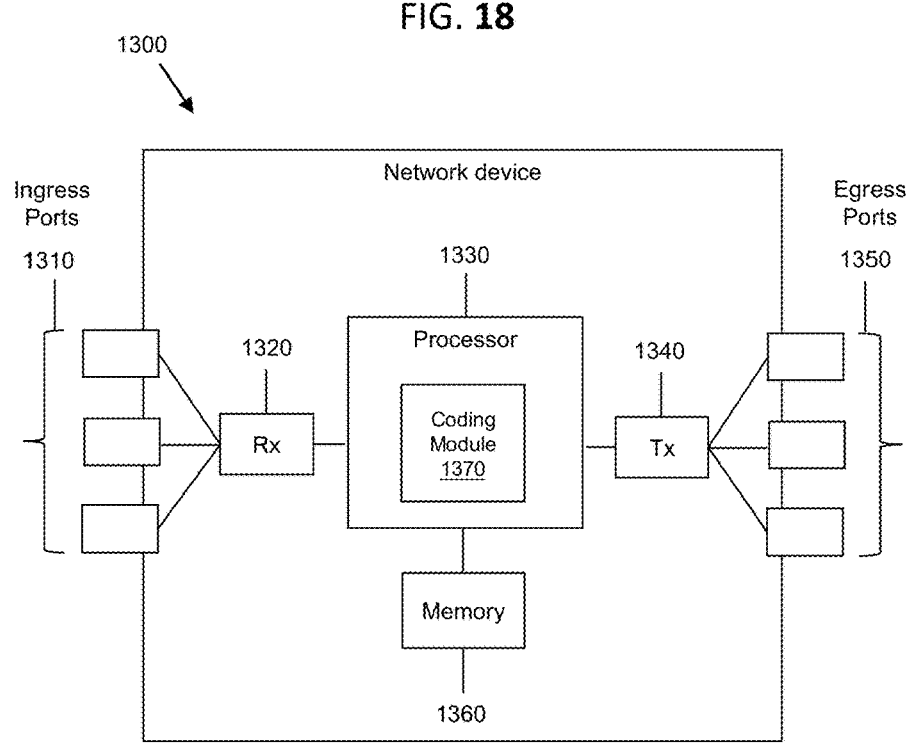
FIG. 19 shows a block diagram of an apparatus according to an embodiment.

FIG. 19 is a schematic diagram of a network device 1300 (e.g., coding device) according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

Provided is a decoder comprising processing circuitry configured for carrying out any one of the above methods.

In the present disclosure, a computer program product is provided, the computer program product comprising a program code is disclosed for performing any one of the above methods.

In the present disclosure, a decoder for decoding video data is provided, the decoder comprising: one or more processors; and a non-transitory computer-readable storage medium coupled to the processors and storing programming for execution by the processors, wherein the programming, when executed by the processors, configures the decoder to carry out any one of the above methods.

A network device suitable for implementing the disclosed embodiments as described herein is described in the following. The network device comprises ingress ports and receiver units (Rx) for receiving data; a processor, logic unit, or central processing unit (CPU) to process the data; transmitter units (Tx) and egress ports for transmitting the data; and a memory for storing the data. The network device may also comprise optical-to-electrical (OE) components and electrical-to-optical (EO) components coupled to the ingress ports, the receiver units the transmitter units, and the egress ports for egress or ingress of optical or electrical signals.

The processor is implemented by hardware and software. The processor may be implemented as one or more CPU chips, cores (e.g., as a multi-core processor), field-programmable gate arrays (FPGAs), application specific integrated circuits (ASICs), and digital signal processors (DSPs). The processor is in communication with the ingress ports, receiver units, transmitter units, egress ports, and memory. The processor comprises a coding module. The coding module implements the disclosed embodiments described above. For instance, the coding module implements, processes, prepares, or provides the various networking functions. The inclusion of the coding module therefore provides a substantial improvement to the functionality of the network device and effects a transformation of the network device to a different state. Alternatively, the coding module is implemented as instructions stored in the memory and executed by the processor.

The memory comprises one or more disks, tape drives, and solid-state drives and may be used as an over-flow data storage device, to store programs when such programs are selected for execution, and to store instructions and data that are read during program execution. The memory may be volatile and/or non-volatile and may be read-only memory (ROM), random access memory (RAM), ternary content-addressable memory (TCAM), and/or static random-access memory (SRAM).

Figure 20:
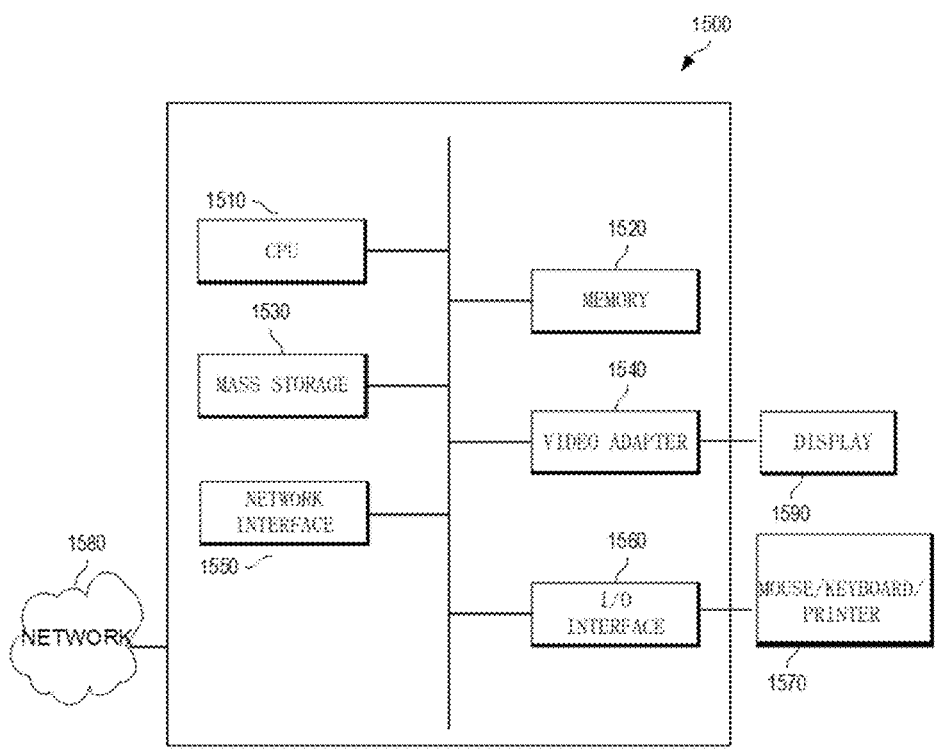
FIG. 20 shows a block diagram of an apparatus according to another embodiment

FIG. 20 is a block diagram of an apparatus 1500 that can be used to implement various embodiments. The apparatus 1500 may be the source device 12 as shown in FIG. 1, or the video encoder 20 as shown in FIG. 2, or the destination device 14 as shown in FIG. 1, or the video decoder 30 as shown in FIG. 3. Additionally, the apparatus 1500 can host one or more of the described elements. In some embodiments, the apparatus 1500 is equipped with one or more input/output devices, such as a speaker, microphone, mouse, touchscreen, keypad, keyboard, printer, display, and the like. The apparatus 1500 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1500. For example, the apparatus 1100 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1500, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1500 to communicate with remote units via the networks 1580. For example, the network interface 1550 may provide communication to database. In an embodiment, the apparatus 1500 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively, or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Definitions of Acronyms & Glossary

JEM: Joint Exploration Model (the software codebase for future video coding exploration)
JVET: Joint Video Experts Team
LUT: Look-Up Table
QT: QuadTree
QTBT: QuadTree plus Binary Tree
RDO: Rate-distortion Optimization
ROM: Read-Only Memory
VTM: VVC Test Model
VVC: Versatile Video Coding, the standardization project developed by JVET.
CTU/CTB: Coding Tree Unit/Coding Tree Block
CU/CB: Coding Unit/Coding Block
PU/PB: Prediction Unit/Prediction Block
TU/TB: Transform Unit/Transform Block
HEVC: High Efficiency Video Coding

What is claimed is:

1. A method for intra-prediction of a current block in video encoding or decoding, the method comprising:
performing intra-prediction processing of the current block according to a directional intra-prediction mode, comprising applying reference sample filtering or sub-pixel interpolation filtering to reference samples in one or more reference blocks, wherein the directional intra-prediction mode is an angular mode of a plurality of intra prediction modes, the plurality of intra prediction modes comprises: planar mode with index 0, direct current (dc) mode with index 1, and angular modes with indices 2 to 66; and
wherein the directional intra-prediction mode is classified into one of the following groups:
A. vertical or horizontal modes,
B. directional modes including diagonal modes that represent angles which are multiples of 45 degrees,
C. remaining directional modes;
applying a reference sample filter to the reference samples, if the directional intra-prediction mode is classified as belonging to group B, copying filtered values into an intra-predictor according to the directional intra-prediction mode; and
applying an intra reference sample interpolation filter to the reference samples, if the directional intra-prediction mode is classified as belonging to group C, generating a predicted sample that falls into a fractional or integer position between the reference samples according to the directional intra-prediction mode, wherein the intra reference sample interpolation filter is selected for a given subpixel offset from a set of filters;
wherein if the directional intra prediction mode is classified as belonging to group A, no filter is applied to the reference samples to generate an intra-predictor.

2. The method according to claim 1, wherein the reference sample filter or the intra-prediction processing is a 3-tap filter.

3. The method according to claim 2, wherein the reference sample filter of the intra-prediction processing is a 3-tap filter of [1, 2, 1].

4. The method according to claim 1, wherein the interpolation filter has length of 4 taps and precision of its coefficient of 6 bits.

5. A non-statutory computer program product comprising program code for performing the method of claim 1 when executed on a computer or processor.

6. A video data decoding device, comprising: a non-transitory memory storage, configured to store video data in a form of a bitstream; and one or more processors coupled to the non-transitory memory storage to configure the video data decoding device to perform the operations of
performing intra-prediction processing of the current block according to a directional intra-prediction mode, comprising applying reference sample filtering or sub-pixel interpolation filtering to reference samples in one or more reference blocks, wherein the directional intra-prediction mode is an angular mode of a plurality of intra prediction modes, the plurality of intra prediction modes comprises: planar mode with index 0, direct current (dc) mode with index 1, and angular modes with indices 2 to 66; and
wherein the directional intra-prediction mode is classified into one of the following groups:
A. vertical or horizontal modes,
B. directional modes including diagonal modes that represent angles which are multiples of 45 degrees,
C. remaining directional modes;
applying a reference sample filter to the reference samples, if the directional intra-prediction mode is classified as belonging to group B, copying filtered values into an intra-predictor according to the directional intra-prediction mode; and
applying an intra reference sample interpolation filter to the reference samples, if the directional intra-prediction mode is classified as belonging to group C, generating a predicted sample that falls into a fractional or integer position between the reference samples according to the directional intra-prediction mode, wherein the intra reference sample interpolation filter is selected for a given subpixel offset from a set of filters;
wherein if the directional intra prediction mode is classified as belonging to group A, no filter is applied to the reference samples to generate an intra-predictor.

7. A method of video coding to perform intra-prediction processing of a current coding block, the method comprising:
obtaining an intra prediction mode of the current coding block, wherein the intra-prediction mode is one of a plurality of intra prediction modes, the plurality of intra prediction modes comprises: planar mode with index 0, direct current (dc) mode with index 1, and angular modes with indices 2 to 66; and;
performing a reference sample filtering process on a reference sample for the current coding block, if the intra prediction mode of the current coding block is a diagonal mode, copying filtered values into an intra-predictor according to the directional intra-prediction mode; and performing an interpolation filtering process on a reference sample for the current coding block, if the intra prediction mode of the current coding block is an angular mode but is not one of a vertical mode, a horizontal mode and a diagonal mode, generating a predicted sample that falls into a fractional or integer position between the reference samples according to the directional intra-prediction mode;

wherein if the intra prediction mode of the current coding block is vertical mode or horizontal mode, no filtering process is applied to the reference sample for the current coding block.

8. The method according to claim 7, wherein the diagonal mode represents angle which is multiple of 45 degrees.

9. The method according to claim 7, wherein the reference sample filtering process is performed based on a 3-tap, [1,2,1] filtering.

10. An apparatus for intra-prediction of a current block in video encoding or decoding, the apparatus comprising:
one or more processors; and
a non-transitory computer-readable storage medium storing a plurality of executable instructions that, when executed by the one or more processors, causes the one or more processors to:
perform intra-prediction processing of the current block according to a directional intra-prediction mode, comprising applying reference sample filtering or subpixel interpolation filtering to reference samples in one or more reference blocks, wherein the directional intra-prediction mode is an angular mode of a plurality of intra prediction modes, the plurality of intra prediction modes comprises: planar mode with index 0, direct current (dc) mode with index 1, and angular modes with indices 2 to 66; and wherein the directional intra-prediction mode is classified into one of the following groups:

A. vertical or horizontal modes,

B. directional modes including diagonal modes that represent angles which are multiples of 45 degrees, C. remaining directional modes;

applying a reference sample filter to the reference samples, if the directional intra-prediction mode is classified as belonging to group B, copying filtered values into an intra-predictor according to the directional intra-prediction mode; and applying an intra reference sample interpolation filter to the reference samples, if the directional intra-prediction mode is classified as belonging to group C, generating a predicted sample that falls into a fractional or integer position between the reference samples according to the directional intra-prediction mode, wherein the intra reference sample interpolation filter is selected for a given subpixel offset from a set of filters;

wherein if the directional intra prediction mode is classified as belonging to group A, no filter is applied to the reference samples to generate an intra-predictor.

* * * * *